(12) United States Patent
Iida et al.

(10) Patent No.: US 11,435,525 B2
(45) Date of Patent: Sep. 6, 2022

(54) SEMICONDUCTOR DEVICE AND METHOD OF MANUFACTURING THE SAME

(71) Applicant: RENESAS ELECTRONICS CORPORATION, Tokyo (JP)

(72) Inventors: Tetsuya Iida, Tokyo (JP); Yasutaka Nakashiba, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 6 days.

(21) Appl. No.: 16/874,176

(22) Filed: May 14, 2020

(65) Prior Publication Data

US 2021/0356660 A1   Nov. 18, 2021

(51) Int. Cl.
| | |
|---|---|
| *G02B 6/122* | (2006.01) |
| *G02B 6/30* | (2006.01) |
| *G02B 6/12* | (2006.01) |
| *G02B 6/24* | (2006.01) |
| *H04B 10/67* | (2013.01) |

(52) U.S. Cl.
CPC ......... *G02B 6/122* (2013.01); *G02B 6/12002* (2013.01); *G02B 6/1228* (2013.01); *G02B 6/241* (2013.01); *G02B 6/305* (2013.01); *H04B 10/671* (2013.01)

(58) Field of Classification Search
CPC ...... G02B 6/122; G02B 6/305; G02B 6/0008; G02B 6/1228; G02B 6/12002; G02B 6/241; G02B 6/262; G02B 6/4403; H04B 10/671
USPC ........................................................... 385/14
See application file for complete search history.

(56) References Cited

U.S. PATENT DOCUMENTS

| | | | |
|---|---|---|---|
| 7,095,920 B1* | 8/2006 | Little ................. | G02B 6/12002 385/131 |
| 8,731,346 B2* | 5/2014 | Tseng ................. | G02B 6/12004 385/14 |
| 9,715,064 B1* | 7/2017 | Gambino .................. | G02B 6/43 |
| 2004/0057667 A1 | 3/2004 | Yamada et al. | |
| 2009/0154880 A1* | 6/2009 | Song ...................... | G02B 6/132 385/46 |
| 2016/0327742 A1* | 11/2016 | Collins ................ | G02B 6/1228 |
| 2020/0241202 A1* | 7/2020 | Vert ...................... | G02B 6/1225 |

FOREIGN PATENT DOCUMENTS

JP          2004-133446 A       4/2004

* cited by examiner

*Primary Examiner* — Michael P Mooney
(74) *Attorney, Agent, or Firm* — McDermott Will & Emery LLP

(57) ABSTRACT

A semiconductor device includes a first insulating film, a first optical waveguide and a second optical waveguide. The first insulating film has a first surface and a second surface opposite to the first surface. The first optical waveguide is formed on the first surface of the first insulating film. The second optical waveguide is formed on the second surface of the first insulating film. The second optical waveguide, in plan view, overlaps with an end portion of the first optical waveguide without overlapping with another end portion of the first optical waveguide.

19 Claims, 28 Drawing Sheets

SEMICONDUCTOR DEVICE AND METHOD OF MANUFACTURING THE SAME

BACKGROUND

The present invention relates to a semiconductor device and method of manufacturing the semiconductor device, for example, the present invention relates to a semiconductor device and method of manufacturing the semiconductor device including a first optical waveguide formed on a first surface of an insulating film and a second optical waveguide formed on a second surface of the insulating film.

There is a disclosed technique listed below.
[Patent Document 1] Japanese Unexamined Patent Application Publication No. 2004-133446

As an optical communication technique, a silicon photonics technique is known. A semiconductor device employing the silicon photonics technique includes, for example, a first insulating film having a first surface and a second surface, a first optical waveguide formed on the first surface of the first insulating film, a second optical waveguide formed on the first surface of the first insulating film, and a second insulating film formed on the first insulating film such that the second insulating film covers the first optical waveguide and the second optical waveguide (see Patent Document 1, for example). An end portion of the second optical waveguide, in a plan view, covers the end portion of the first optical waveguide. Thus, light propagating in the first optical waveguide can travel to the second optical waveguide.

However, when both the first optical waveguide and the second optical waveguide are formed on the first surface of the first insulating film, the semiconductor device may not be properly manufactured. For example, if a material of the second optical waveguide is a material with large stresses, cracks may be formed in the first optical waveguide covered with the second optical waveguide. When a thickness of the first optical waveguide and a thickness of the second optical waveguide are different from each other, the first optical waveguide and the second optical waveguide may not be formed under the same processing condition. If the first optical waveguide and the second optical waveguide are formed under the same processing condition, desired characteristics may not be obtained. In this way, conventional semiconductor device sometimes has poor characteristics of the semiconductor device.

A problem of the present embodiments is improving of the characteristics of a semiconductor device. Other problems and novel features will become apparent from the description of the specification and drawings.

SUMMARY

A semiconductor device according to the embodiments includes a first insulating film having a first surface and a second surface opposite to the first surface, a first optical waveguide formed on the first surface, and a second optical waveguide formed on a second surface. The second optical waveguide overlaps with an end portion of the first optical waveguide without overlapping with another end portion of the first optical waveguide in plan view.

A method of manufacturing a semiconductor device according to embodiments includes (a) providing a semiconductor wafer including a first semiconductor layer, a first insulating film formed on the first semiconductor layer, and a second semiconductor layer formed on the first insulating film, (b) patterning the first semiconductor layer to form a first optical waveguide, and (c) patterning the second semiconductor layer to form a second optical waveguide. The second optical waveguide overlaps with an end portion of the first optical waveguide without overlapping with another end portion of the first optical waveguide in plan view.

According to embodiments, the characteristics of the semiconductor device can be improved.

DETAILED DESCRIPTION

Figure 1:
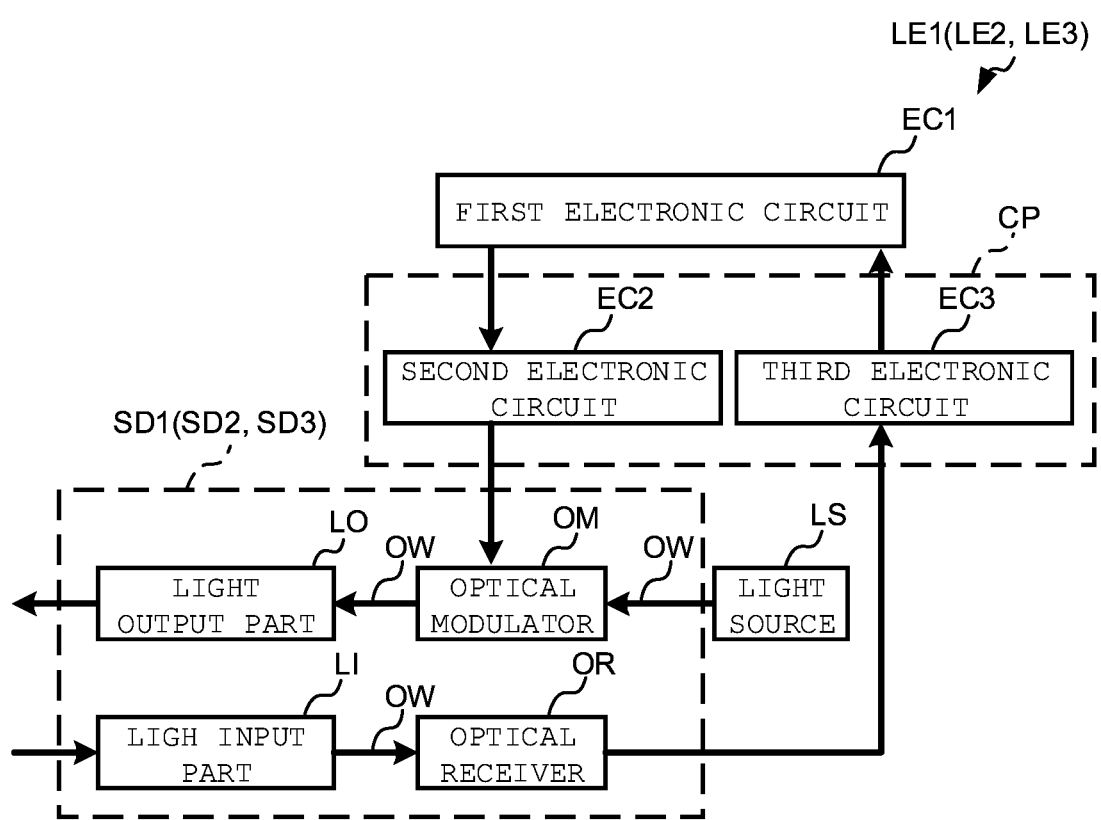
FIG. 1 is a block diagram showing an exemplary circuit configuration of an optoelectronic hybrid device according to a first embodiment.

Hereinafter, a semiconductor device and method of manufacturing the semiconductor device according to embodiments will be described in detail by referring to the drawings. In the specification and the drawings, the same or corresponding elements are denoted by the same reference numerals or the same hatching, and a repetitive description thereof is omitted. In the drawings, for convenience of description, the configuration may be omitted or simplified. A cross-sectional view may also be shown as an end view.

[First Embodiment]

(Circuit Configuration of Optoelectronic Hybrid Device)

FIG. 1 is a block diagram showing an exemplary circuit configuration of an optoelectronic hybrid device LE1 according to a first embodiment.

As shown in FIG. 1, the optoelectronic hybrid device LE1 includes a first electronic circuit, a light source LS, an IC chip CP, and a semiconductor device SD1. The IC chip CP includes a second electronic circuit EC2 and a third electronic circuit EC3. The semiconductor device SD1 includes an optical waveguide OW, an optical modulator OM, a light output part LO, a light input part LI and an optical receiver OR. The configuration of the semiconductor device SD1 will be described in detail later.

The first electronic circuit EC1 outputs an electrical signal (control signal) for control the second electronic circuit EC2. The first electronic circuit EC1 receives an electrical signal outputted from the third electronic circuit EC3. The first electronic circuit EC1 is electrically coupled with the second electronic circuit EC2 and the third electronic circuit EC3. The first electronic circuit EC1 is formed of, for example, a CPU (Central Processing Unit) or an FPGA (Field-Programmable gate array) including a control circuit and a storage circuit.

The light source LS emits light. An Example of type of light sources LS includes laser diode. A wavelength of the light emitted from the light source LS may be set as appropriate in accordance with a material constituting the optical waveguide OW as long as the emitted light can pass through an inside of the optical waveguide OW. For example, a peak wavelength of the emitted light from the light source LS is 1.0 μm or more and 1.6 μm or less. The light source LS is optically connected with the optical modulator OM through the optical waveguide OW.

The second electronic circuit EC2 outputs an electric signal (control signal) for controlling the operation of the optical modulator OM. More specifically, the second electronic circuit EC2 controls the optical modulator OM based on the control signal received from the first electronic circuit EC1. The second electronic circuit EC2 is electrically coupled with the optical modulator OM. The second electronic circuit EC2 is constituted by, for example, a known transceiver IC including a control circuit. The second electronic circuit EC2 may be formed in the semiconductor device SD1.

The optical modulator OM modulates the phase of the light emitted from the light source LS based on the electrical signal received from the second electronic circuit EC2. The optical modulator OM generates an optical signal including information included in the electrical signal. A type of the optical modulator OM is a Mach-Zehnder type optical modulator. The optical modulator OM may be an electrically controlled optical modulator, or a combined optical modulator using a combination of electrical control and thermal control. The optical modulator OM is optically connected with the light output part LO through the optical waveguide OW.

The light output part LO outputs the optical signal modulated by the optical modulator OM toward an outside of the semiconductor device SD1. For example, the light output part LO emits an optical signal toward an external optical fiber. An Example of type of the light output part LO include a grating coupler (GC) and a spot size converter (SSC).

The light input part LI inputs external light into the semiconductor device SD1. For example, an optical signal emitted from an external optical fiber is inputted into the semiconductor device SD1. An Example of type of light input part LI include a grating coupler (GC) and a spot size converter (SSC). The light input part LI is optically connected with the optical receiver OR through the optical waveguide OW.

The optical receiver OR generates electron-hole pairs based on the optical signal received from the light input part LI. The optical receiver OR converts an optical signal into an electric signal. The optical receiver OR may have photoelectric conversion characteristics. An Example of a type of the optical receiver OR include an avalanche photodiode type optical receiver. The optical receiver OR is electrically coupled with the third electronic circuit EC3.

The third electronic circuit EC3 processes the electrical signal received from the optical receiver OR and outputs the processed electrical signal toward the first electronic circuit EC1. More specifically, the third electronic circuit EC3 amplifies the electric signal received from the optical receiver OR and outputs the amplified electrical signal to the first electronic circuit EC1. The third electronic circuit EC3 is constituted by, for example, a known receiver IC including an amplifier circuit. The third electronic circuit EC3 may be formed in the semiconductor device SD1.

[Operation of Optelectronic Hybrid Device]

Next, an operation example of the optoelectronic hybrid device LE1 according to the present embodiment will be described.

First, a transmission part of the optoelectronic hybrid device LE1 will be described. The light emitted from the light source LS reaches the optical modulator OM through the optical waveguide OW. The second electronic circuit EC2 outputs an electric signal for controlling the operation of the optical modulator OM to the optical modulator OM based on a control signal received from the first electronic circuit EC1. The optical modulator OM modulates light passing through the optical modulator OM. As a result, an electric signal is converted into an optical signal. The optical signal reaches the light output part LO through the optical waveguide OW, and the optical signal is output to an outside of the semiconductor device SD1 in the light output part LO. The optical signal emitted from the semiconductor device SD1 is guided toward another optoelectronic hybrid device through an optical fiber or the like.

Next, a receiving part of the optoelectronic hybrid device LE1 will be described. An optical signal guided from another optoelectronic hybrid device through an optical fiber or the like reach the light input part LI. The optical signal is guided to an inside of the optical waveguide OW in the light input part LI. The optical signal reaches the optical receiver OR through the optical waveguide OW, and is converted into an electric signal. The electric signal is processed by the third electronic circuit EC3 and then transmitted to the first electronic circuit EC1.

(Configuration of Semiconductor Device)

Figure 2:
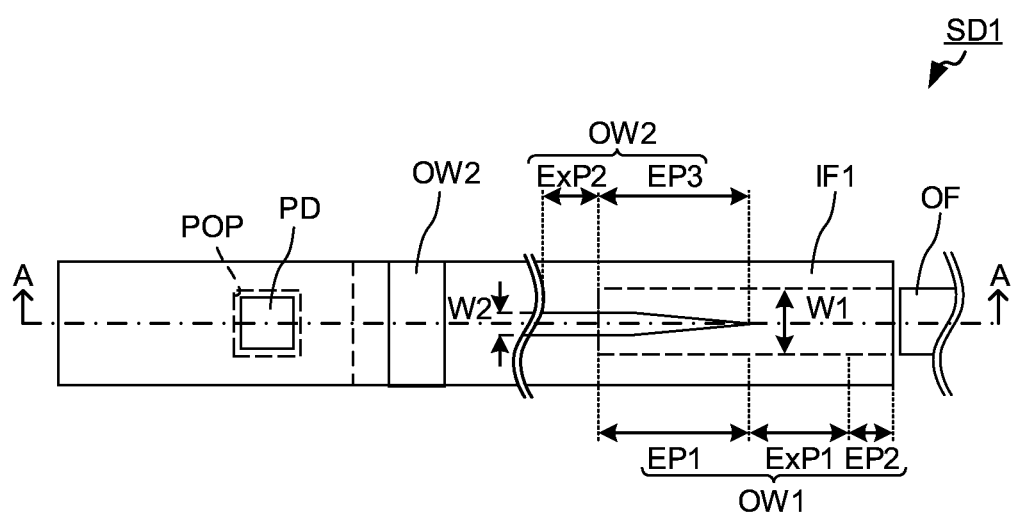
FIG. 2 is a plan view showing an exemplary configuration of a main portion of a semiconductor device according to the first embodiment.
Figure 3:
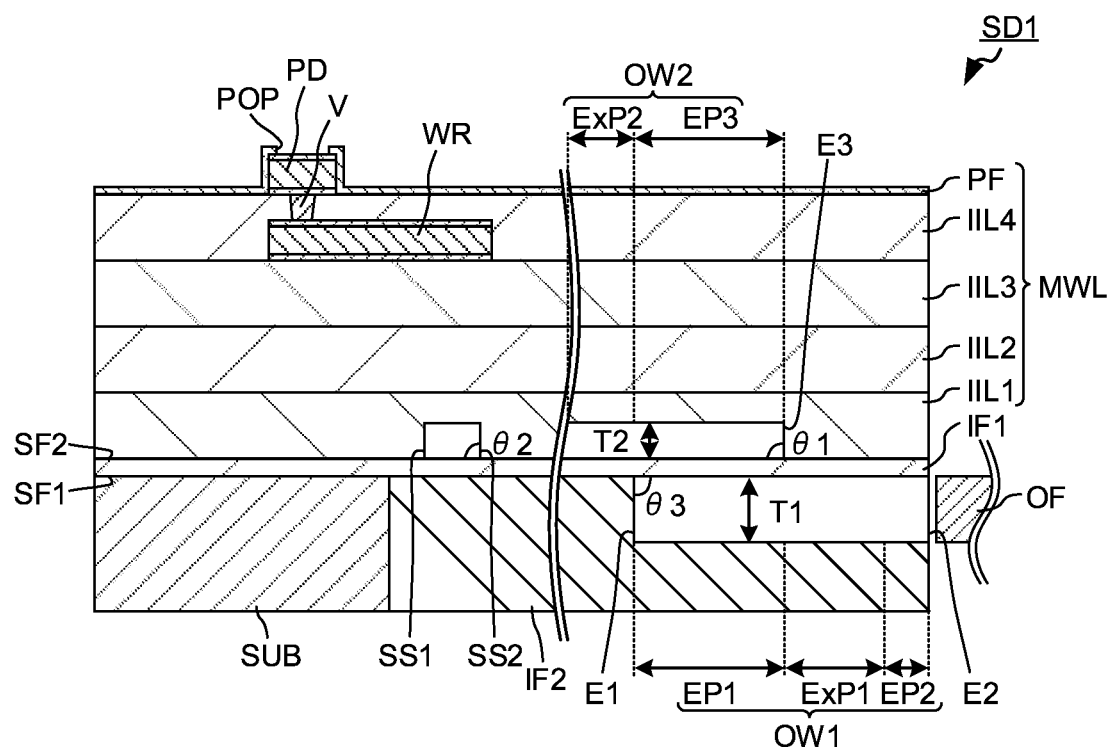
FIG. 3 is a cross-sectional view showing an exemplary configuration of the main portion of the semiconductor device according to the first embodiment.

FIG. 2 is a plan view showing an exemplary configuration of a main portion of the semiconductor device SD1 according to the first embodiment. FIG. 3 is a cross-sectional view showing an exemplary configuration of the main portion of the semiconductor device SD1 according to the first embodiment. FIG. 3 is a cross-sectional view taken along a line A-A of FIG. 2. In FIG. 3, hatching of the first optical waveguide OW1 and the second optical waveguide OW2 is omitted.

The semiconductor device SD1 includes a semiconductor substrate SUB, a first insulating film IF1, a first optical waveguide OW1, a second optical waveguide OW2, a second insulating film IF2, and a multilayer wiring layer MWL. Further, the optical fiber OF is disposed at a position corresponding to the optical input and output portion of the semiconductor device SD1. In FIG. 2, from the viewpoint of legibility, a portion of multilayer wiring layer MWL is omitted.

(Semiconductor Substrate)

The semiconductor substrate SUB supports the multilayer wiring layer MWL through the first insulating film IF1. The semiconductor substrate SUB has front and back surfaces that are in front and back relationships with each other. The front face is located on the other side of the back face in the semiconductor substrate SUB. The semiconductor substrate SUB is, for example, a silicone substrate. The silicon substrate is, for example, a single crystal substrate containing impurities such as boron (B) and phosphorus (P), or a polycrystalline substrate. For example, a face orientation of the front surface of the silicon substrate is (100), the resistivity of the silicon substrate is 5 Ω·cm or more and 50 Ω·cm or less.

The semiconductor substrate SUB is formed without overlapping with the first optical waveguide OW1 and the second optical waveguide OW2 in a plan view. Thus, the light seeping from each of the first optical waveguide OW1 and the second optical waveguide OW2 can be suppressed from being scattered reaching the semiconductor substrate SUB. As a result, the optical propagation loss in the semiconductor device SD1 can be reduced.

A thickness of the semiconductor substrate SUB may be different from or the same as a thickness of the second optical waveguide OW2. The thickness of the semiconductor substrate SUB is, for example, 2 μm or more and 400 μm or less.

(First Insulating Film)

The first insulating film IF1 supports the first optical waveguide OW1 and the second optical waveguide OW2. The first insulating film IF1 has a first surface SF1 and a second surface SF2. The first insulating film IF1 is a cladding layer for substantially confining the light propagating inside the first optical waveguide OW1 and the second optical waveguide OW2 to the inside of the first optical waveguide OW1 and the second optical waveguide OW2, respectively. A material of the first insulating film IF1 has a refractive index smaller than a refractive index of a material of the first optical waveguide OW1 and the second optical waveguide OW2. The first insulating film IF1 is comprised of, for example, silicon oxide ($SiO_2$) or silicon nitride (SiN). When the material of the first insulating layer film IF1 is silicon oxide, the refractive index of the material of the first insulating film IF1 is, for example, 1.46. In the specification, the refractive index is a numerical value for light having a wavelength of 1.5 μm.

In the first embodiment, a thickness of the first insulating film IF1 is smaller than a seeping distance of the light from the first optical waveguide OW1 and the second optical waveguide OW2. Although described in detail later, thereby, the light is possible to transmit between the first optical waveguide OW1 and the second optical waveguide OW2 through the first insulating film IF1. It is preferable that the thickness of the first insulating film IF1 is small from the viewpoint of reducing stresses generated in the semiconductor device SD1 and suppressing sticking of a semiconductor wafer by an electrostatic chuck when manufacturing the semiconductor device SD1. For example, the thickness of the first insulating film IF1 is the same as or less than the thickness of one or both of the first optical waveguide OW1 and the second optical waveguide OW2. In the first embodiment, the thickness of the first insulating film IF1 is the same as or less than the thickness of the second optical waveguide OW2. The thickness of the first insulating film IF1 is, for example, 100 nm or more and 200 nm or less.

The configuration of the first insulating film IF1 is not particularly limited as long as the transmission of light between the first optical waveguide OW1 and the second optical waveguide OW2 is not hindered. For example, the first insulating film IF1 may be a single film or a stacked film. In the first embodiment, the first insulating film IF1 is a single film.

(First Optical Waveguide)

The first optical waveguide OW1 is formed on the first surface SF1 of the first insulating film IF1. The first optical waveguide OW1 include a first end portion (one end portion) EP1, a second end portion (another end portion) EP2 and a first extending portion ExP1. The first end portion EP1, the second end portion EP2, and the first extending portion ExP1 may be formed integrally with each other as a single member, or may be formed separately from each other. In the first embodiment, the first end portion EP1, the second end portion EP2 and the first extending portion ExP1 are integrally formed with each other as a single member.

A width of the first end portion EP1 may be the same as or different from a width of second end portion EP2 and a width of the first extending portion ExP1. In the first embodiment, the width of the first end portion EP1 is the same as one or both of the width of second end portion EP2 and the width of the first extending portion ExP1. A thickness of the first end portion EP1 may be the same as or different from one or both of the thickness of second end portion EP2 and the thickness of the first extending portion ExP1. In the first embodiment, the thickness of the first end portion EP1 is the same as the thickness of second end portion EP2 and the thickness of the first extending portion ExP1.

The first extending portion ExP1 is formed between the first end portion EP1 and the second end portion EP2. A position and a shape of the first extending portion ExP1 are not particularly limited. The shape of the first extending portion ExP1 may be a linear shape or a curved shape in plan view. The first extending portion ExP1 may include a bent portion.

The second end portion EP2 is located on an outer edge of the first insulating film IF1. The second end portion EP2 faces a light receiving surface of an optical fiber OF. Thus, the second optical waveguide OW2 can guide light from the second end portion EP2 to the optical fiber OF. Here, the outer edge of the first insulating film IF1, of the first insulating film IF1, in a direction along the first surface SF1 of the first insulating film IF1, a position capable of inputoutput and outputting light between the second optical waveguide OW2 and the optical fiber OF.

The first optical waveguide OW1 is a path through which light can propagate (travel). The first optical waveguide OW1 is configured to allow light transmit between the first optical waveguide OW1 and the second optical waveguide OW2. In the first embodiment, the first optical waveguide OW1 is configured to allow light propagate from the second optical waveguide OW2. The first optical waveguide OW1, in plan view, overlaps with an end portion (third end portion EP3 described later) of the second optical waveguide OW2, and does not overlap with another end portion of the second optical waveguide OW2 (not shown). More specifically, the first end portion EP1 of the first optical waveguide OW1 overlaps the end portion (the third end portion EP3) of the second optical waveguide OW2. The second end portion EP2 and the first extending portion ExP1 of the first optical waveguide OW1 does not overlap the other end portion of the second optical waveguide OW2 (not shown). In the first embodiment, the first optical waveguide OW1, in plan view, of the second optical waveguide OW2, does not overlap with a portion other than the end portion (the third end EP3).

The first end portion EP1 of the first optical waveguide OW1, in plan view, may overlap with an entire of the end portion of the second optical waveguide OW2 (the third end portion EP3), or may overlap with a portion of the end portion (the third end portion EP3) of the second optical waveguide OW2. From the viewpoint of reducing the propagation loss of light between the first optical waveguide OW1 and the second optical waveguide OW2, the first end portion EP1 of the first optical waveguide OW1, in plan view, the second optical waveguide OW2 it is preferable to overlap with entire of the end portion (the third end portion EP3).

A thickness T1 of the first optical waveguide OW1 is preferably greater than a thickness T2 of the second optical waveguide OW2. The thickness T1 of the first optical waveguide OW1 is preferably same as a diameter of the optical fiber OF.

Thus, it is possible to reduce the propagation loss of light between the first optical waveguide OW1 and the optical fiber OF. The thickness T1 of the first optical waveguide OW1, for example, 3 μm or more and 5 μm or less. Here, the thickness T1 of the first optical waveguide OW1, in the facing direction of an upper surface and a lower surface of the first optical waveguide OW1, a distance of the upper surface and the lower surface of the first optical waveguide OW1.

A width W1 of the first optical waveguide OW1 is preferably greater than a width W2 of the second optical waveguide OW2. The width W1 of the first optical waveguide OW1 is preferably a same as the diameter of the optical fiber OF. Thus, it is possible to reduce the propagation loss of light between the first optical waveguide OW1 and the optical fiber OF. The first optical waveguide OW1 has the width W1 of 1 μm or more and 3 μm or less. Here, the width W1 of the first optical waveguide OW1 is a distance between the first side surface and the second side surface of the first optical waveguide OW1 in the facing direction of a first side surface and a second side surface of the first optical waveguide OW1.

A cross-sectional shape of the first optical waveguide OW1 is rectangular or trapezoidal. As described above, an example of a material of the first optical waveguide OW1 include silicon (Si) and germanium (Ge). An example of crystalline structure of a material of the first optical waveguide OW1 include single crystals and polycrystals. From the viewpoint of reducing the propagation loss of light in an optical element, the crystal structure of the material of the first optical waveguide OW1 is preferably a single crystal. From the viewpoint of improving the coupling efficiency between the waveguides, the refractive index of the material of the first optical waveguide OW1 is preferably smaller than the refractive index of the material of the second optical waveguide OW2. Thus, when a size of the first optical waveguide OW1 (thickness and width) is smaller than a size of the second optical waveguide OW2, while maintaining a mode of light, between the first optical waveguide OW1 and the second optical waveguide OW2 light is easily propagated.

The first edge E1 of the first optical waveguide OW1, in plan view, overlaps with the second optical waveguide OW2. The first edge E1 of the first optical waveguide OW1 is formed along the third edge E3 of the second optical waveguide OW2. In the specification, the "edge" of the optical waveguide is a surface (front surface, back surface) or a line (ridge line) intersecting with an optical axis of the light propagating in the optical waveguide, among a plurality of surfaces and lines constituting the optical waveguide.

The second edge E2 of the first optical waveguide OW1, in the first optical waveguide OW1, is located on the opposite side of the first edge E1. The second edge E2 of the first optical waveguide OW1 is an exit surface or the entrance surface of the light. The second edge E2 is located on the outer edge of the first insulating film IF1. The second edge E2 faces the optical fiber OF.

(Second Optical Waveguide)

The second optical waveguide OW2 is formed on the second surface SF2 of the first insulating film IF1. The second optical waveguide OW2 includes a third end portion EP3, a fourth end portion (not shown) and a second extending portion ExP2. The third end portion EP3, the fourth end portion (not shown) and the second extending portion ExP2 may be formed integrally with each other as a single member, or separately from each other. In the first embodiment, the third end portion EP3, the fourth end portion (not shown), and second extension portion ExP2 are integrally formed with each other as a single member.

The width of third end portion EP3 may be the same as or different from the width of the second extending portion ExP2. The width of the third end portion EP3 may vary toward the end portion of the second optical waveguide OW2 or may be constant. A planar shape of an upper surface of the third end portion EP3 may be triangular or trapezoidal. From the viewpoint of efficiently transmitting from the second optical waveguide OW2 to the first optical waveguide OW1, the width of the third end portion EP3 is preferably reduced toward the end of the second optical waveguide OW2. That is, it is preferable that the upper surface of the third end portion EP3 has a triangular shape in plan view. The thickness of the third end portion EP3 may be the same as or different from the thickness of the second extending portion ExP2. In the first embodiment, the thickness of the third end portion EP3 is the same as the thickness of the second extending portion ExP2.

The second extending portion ExP2 is formed between the third end portion EP3 and the fourth end portion (not shown). A position and a shape of the second extending portion ExP2 are not particularly limited. The shape of the second extending portion ExP2 may be a straight shape or a curved shape in plan view. The first extending portion ExP1 may include a bent portion.

The second optical waveguide OW2 is a path through which light can propagate (travel). The second optical waveguide OW2 is configured to allow light to travel between the first optical waveguide OW1 and the second optical waveguide OW2. The second optical waveguide OW2, in plan view, overlaps with the first end portion EP1 of the first optical waveguide OW1, and does not overlap with the second end portion EP2 of the first optical waveguide OW1. Thus, the light propagating in the second optical waveguide OW2 can propagate to the first end portion EP1 of the first optical waveguide OW1 at third end portion EP3.

The thickness T2 of the second optical waveguide OW2 is not particularly limited as long as the above-mentioned function can be realized. The thickness T2 of the second optical waveguide OW2, for example, is 200 nm or more and 400 nm or less. Here, the thickness T2 of the second optical waveguide OW2, in the facing direction of an upper surface and a lower surface of the second optical waveguide OW2, is a distance between the upper surface and the lower surface of the second optical waveguide OW2.

The width W2 of the second optical waveguide OW2 is greater than or equal to 300 nm and less than or equal to 500 nm. The width W2 of the second optical waveguides OW2 is distance between a first side surfaces SS1 and a second side surface SS2 of the second optical waveguides OW2 in a facing direction of the first side surfaces SS1 and the second side surface SS2 of the second optical waveguide OW2.

The cross-sectional shape of the second optical waveguide OW2 is rectangular or trapezoidal. An Example of a material of the second optical waveguide OW2 include silicon (Si) and germanium (Ge). An Example of crystalline structure of the material of the second optical waveguide OW2 include single crystals and polycrystals. From the viewpoint of reducing the propagation loss of light in the optical element, the crystal structure of the material of the second optical waveguide OW2 is preferably a single crystal. The material of the second optical waveguide OW2 may be the same as or different from the material of the first optical waveguide OW1.

In the first embodiment, a first angle $\theta 1$ formed by the third edge E3 of the third end portion EP3 in the second optical waveguide OW2, and the second surface SF2 of the first insulating film IF1 is about the same as a second angle $\theta 2$ formed by the first side surface SS1 or the second side surface SS2 of the second optical waveguide OW2, and the second surface SF2 of the first insulating film IF1. In the first embodiment, the first angle $\theta 1$ and the second angle $\theta 2$ are approximately 90°.

(Second Insulating Film)

The second insulating film IF2 is formed on the first surface SF1 of the first insulating film IF1 such that the second insulating film IF2 covers the first optical waveguide OW1, The second insulating film IF2 may or may not cover the semiconductor substrate SUB. In the first embodiment, the second insulating film IF2 is formed such that the semiconductor substrate SUB is exposed from the second insulating film IF2.

The thickness of the second insulating film IF2, from the viewpoint of reducing the propagation loss of light, it is preferable to be greater than a seeping distance of the light from the first optical waveguide OW1. Of the second insulating film IF2, the thickness of a portion located on the first optical waveguide OW1, for example, is 2 μm or more and 5 μm or less.

The material of the second insulating film IF2 has a refractive index smaller than a refractive index of the material of the first optical waveguide OW1. The material of the second insulating film IF2 is, for example, resins, silicon oxides, or silicon nitrides. The refractive index of the second insulating film IF2 is, for example, about 1.5. The second insulating film IF2 may be a single film or a stacked film.

(Multilayer Wiring Layer)

The multilayer wiring layer MWL is formed on the first insulating film IF1 such that the multilayer wiring layer MWL covers the second optical waveguide OW2. The multilayer wiring layer MWL is formed of two or more wiring layers. The wiring layer is a layer including an interlayer insulating layer and one or both of a wiring and a via that are formed in the interlayer insulating layer. The via is a conductive member electrically connecting two wirings formed in layers that differ from each other.

The multilayer wiring layer MWL includes a first interlayer insulating layer IIL1, a second interlayer insulating layer IIL2, a third interlayer insulating layer IIL3, a fourth interlayer insulating layer IIL4, a wiring WR, a via V, an electrode pad PD, and a protective film PF.

The first interlayer insulating layer IIL1 is formed on the first insulating film IF1 such that the first interlayer insulating layer IIL1 covers the second optical waveguide OW2. The first interlayer insulating layer IIL1 is a cladding layer for substantially confining the light propagating an inside of the second optical waveguide OW2 to the inside of the second optical waveguide OW2. Light in the second extending portion ExP2 of the second optical waveguide OW2 travels in a state of being seeped by about one-fifth of the wavelength of the light from the second optical waveguide OW2. The light in the third end portion EP3 of the second optical waveguide OW2 travels through about twice the wavelength thereof. A thickness of the first interlayer insulating layer IIL1 is preferably 1 μm or more and 5 μm or less, and more preferably 2 μm or more and not 3 μm or less, from the viewpoint of suppressing scattering of light seeped from the second optical waveguide OW2 by a wiring (not shown) formed on the first interlayer insulating layer IIL1. A material of the first interlayer insulating layer IIL1 are the same as the material of the first insulating film IF1.

The second interlayer insulating layer IIL2 is formed on the first interlayer insulating layer IIL1. The third interlayer insulating layer IIL3 is formed on the second interlayer insulating layer IIL2. The fourth interlayer insulating layer IIL4 is formed on the third interlayer insulating layer IIL3. Features such as a thickness and a material of the second interlayer insulating layer IIL2, the third interlayer insulating layer IIL3, and the fourth interlayer insulating layer IIL4 may be the same or different from each other.

The wiring WR is formed on the third interlayer insulating layer IIL3. For the wiring WR, known configurations employed as wiring in the semiconductor art may be employed. The wiring WR is, for example, a stacked film in which a barrier metal, a conductive film and a barrier metal are stacked in this order. An example of a material constituting the barrier metal include titanium (Ti), titanium nitride (TiN), tantalum (Ta) and tantalum nitride (TaN). An example of a material of the conductive film include aluminum and copper. Incidentally, the wiring WR may be formed on the other interlayer insulating layer.

The via V is formed in the fourth interlayer insulating layer IIL4 such that the via V reaches the wiring WR. The first via V includes, for example, a barrier film and a conductive film formed on the barrier film. An example of a material of the barrier film include titanium (Ti), titanium nitride (TiN), tantalum (Ta), and tantalum nitride (TaN). An example of a material of the conductive film include tungsten (W) and aluminum (Al). The barrier film is not an essential element. The via V may be formed on another interlayer insulating layer.

For the electrode pad PD formed on the fourth interlayer insulating layer IIL4, a known structure employed as an electrode pad in the semiconductor technology can be employed as the electrode pad PD. The electrode pad PD is, for example, a stacked film in which a barrier metal, a conductive film and a barrier metal are stacked in this order. An example of a material of the barrier metal include titanium (Ti), titanium nitride (TiN), tantalum (Ta) and tantalum nitride (TaN). An example of a material of the conductive film include aluminum and copper.

The protective film PF is a film for protecting the semiconductor device SD1 from water and the like. The protective film PF is formed on the fourth interlayer insulating layer IIL4. In the protective film PF, a pad opening POP exposing a portion of an upper surface of the electrode pad PD is formed. The portion of the electrode pad PD exposed from the pad opening POP is connected with an external wiring such as a bonding wire. From the viewpoint of suppressing damage is applied to the first optical waveguide OW1 and the second optical waveguide OW2 due to the impact when the external wiring is connected to the electrode pad PD, it is preferable that the pad opening POP is formed in the protective film PF such that the pad opening POP, in plan view, overlaps with the first optical waveguide OW1 and the second optical waveguide OW2.

An example of a material of the protective film PF includes silicon oxide, silicon oxynitride, silicon nitride, and PSG (Phospho Silicate Glass). A thickness of the protective film PF is, for example, 0.3 μm or more and 0.7 μm or less. The protective film PF may be a single film or a stacked film of a film comprised of the above materials.

The optical fiber OF is a light guide member that guides light from an external device into the semiconductor device SD1, and guides light from the semiconductor device SD1 toward the external device. The optical fiber OF is disposed such that the optical fiber OF faces a portion that functions as the light exiting surface or the light receiving surface of the first optical waveguide OW1. In the first embodiment, the optical fiber OF, in a direction along the first surface SF1 of the first insulating film IF1, and faces the second edge E2 of the first optical waveguide OW1.

(Optical Path in Semiconductor Device)

Here, an optical path in the semiconductor device SD1 according to the first embodiment will be described. For example, in the semiconductor device SD1, the optical path until the light emitted from the light source LS reaches the optical fiber OF through the second optical waveguide OW2 and the first optical waveguide OW1 will be described.

Figure 4:
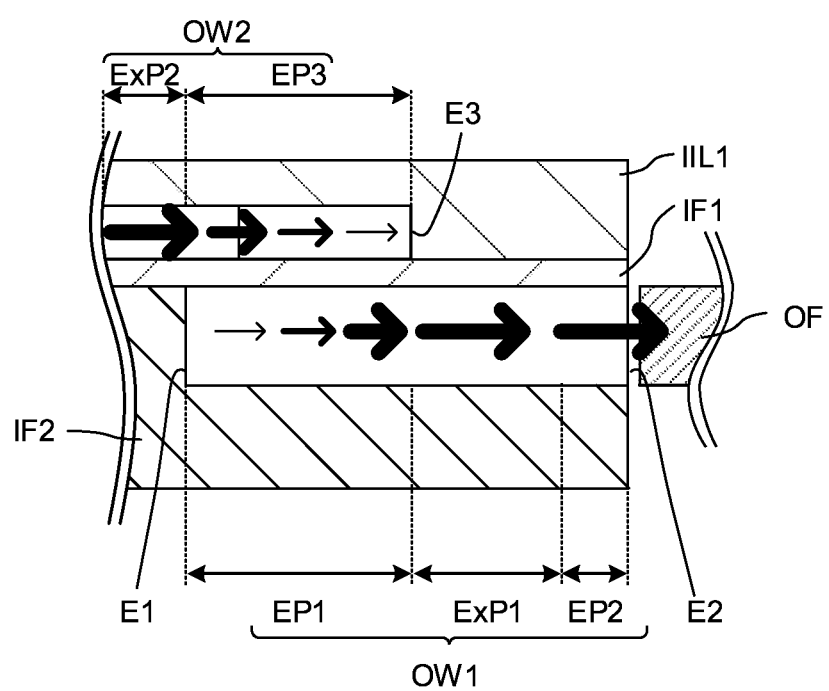
FIG. 4 is a cross-sectional view showing the main portion of an optical path in the semiconductor device according to the first embodiment.

FIG. 4 is a cross-sectional view showing a main portion of an optical path in the semiconductor device SD1 according to the first embodiment. In FIG. 4, an arrow indicates a traveling direction of the light, a thickness of the arrow indicates the amount of light. In the first embodiment, the first optical waveguide OW1 has a function as a spot-size converter. In FIG. 4, from the viewpoint of viewability of the optical path, hatching of the first optical waveguide OW1 and the second optical waveguide OW2 is omitted.

As shown in FIG. 4, in the semiconductor device SD1 according to the first embodiment, the light traveling in the second extending portion ExP2 of the second optical waveguide OW2 reaches the third end portion EP3 of the second optical waveguide OW2. Light traveling in the third end portion EP3 is transmitted to the first optical waveguide OW1 as the light approaches the third edge E3. This is because, while seeping out of the second optical waveguide OW2, the light traveling through the second optical waveguide OW2 is transferred to the first optical waveguide OW1 by evanescent coupling. The width of the third end portion EP3 decrease as it approaches the third edge E3. As the width of the third end portion EP3 decreases, the amount of light present in the second optical waveguide OW2 also decreases. Light moved from the second optical waveguide OW2 to the first optical waveguide OW1 is emitted at the second end portion EP2 (the second edge E2) of the first optical waveguide OW1, and reaches the optical fiber OF.

(Method of Manufacturing Semiconductor Device)

Next, an exemplary method of manufacturing the semiconductor device SD1 according to the first embodiment will be described. FIGS. 5 to 10 are cross-sectional views showing exemplary steps included in the method of manufacturing the semiconductor device SD1.

Figure 9:
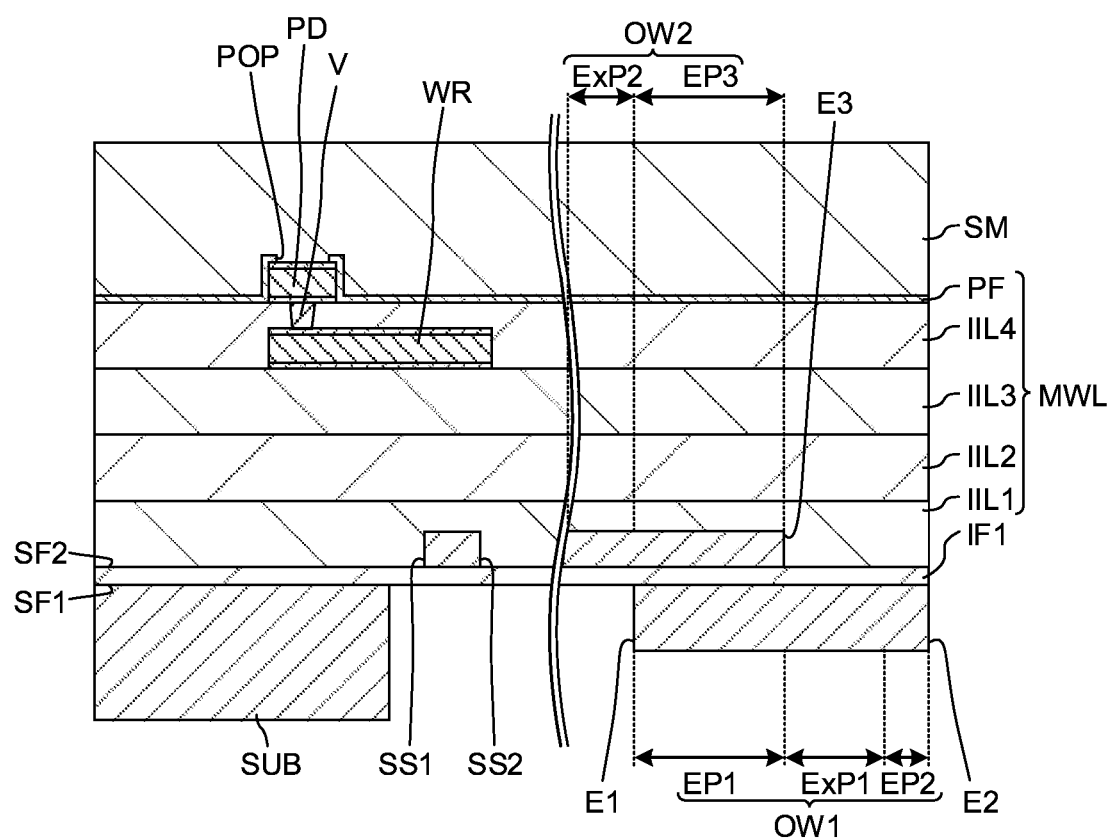
FIG. 9 is a cross-sectional view showing an exemplary step included in the method of manufacturing the semiconductor device according to the first embodiment.
Figure 10:
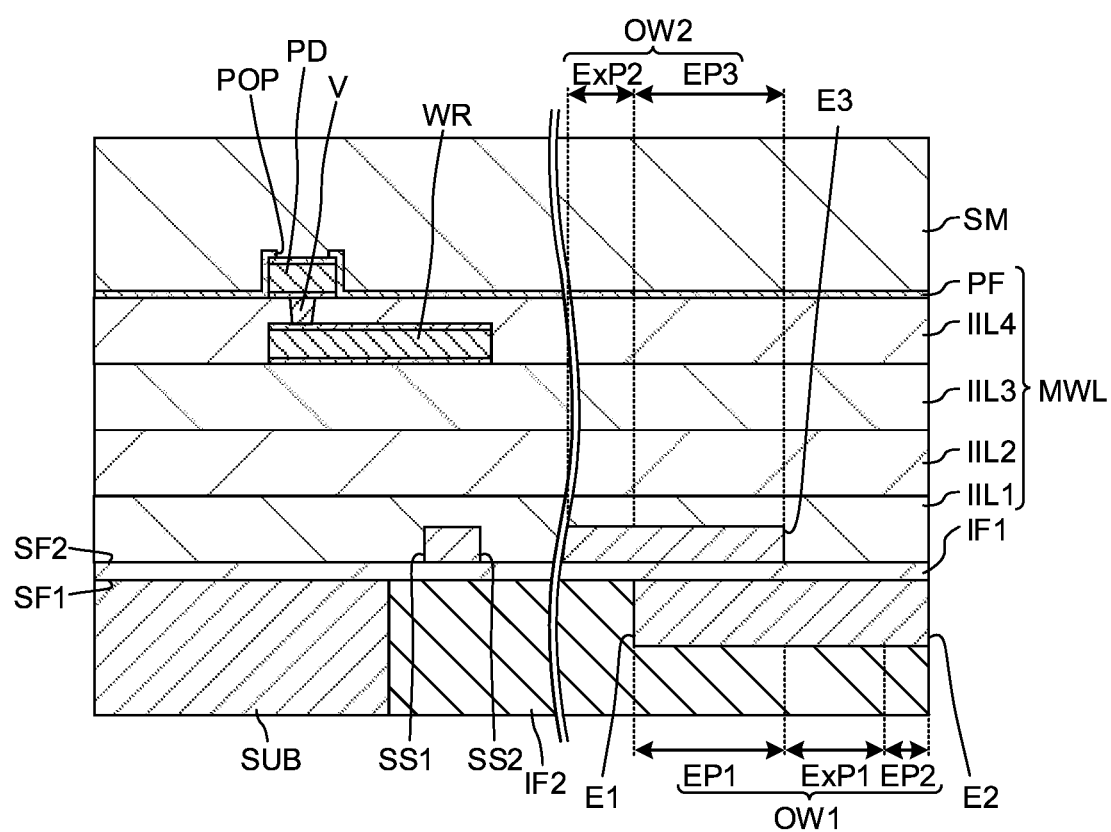
FIG. 10 is a cross-sectional view showing an exemplary step included in the method of manufacturing the semiconductor device according to the first embodiment.

The method of manufacturing the semiconductor device SD1 includes (1) providing a semiconductor wafer SW (see FIG. 5), (2) forming the second optical waveguide OW2 (see FIG. 6), (3) forming the multilayer wiring layer MWL (see FIG. 7), (4) disposing a support member SM (see FIG. 8), (5) forming the first optical waveguide OW1 (see FIG. 9), and (6) forming the second insulating film IF2 (see FIG. 10).

(1) Providing of a semiconductor wafer SW

Figure 5:
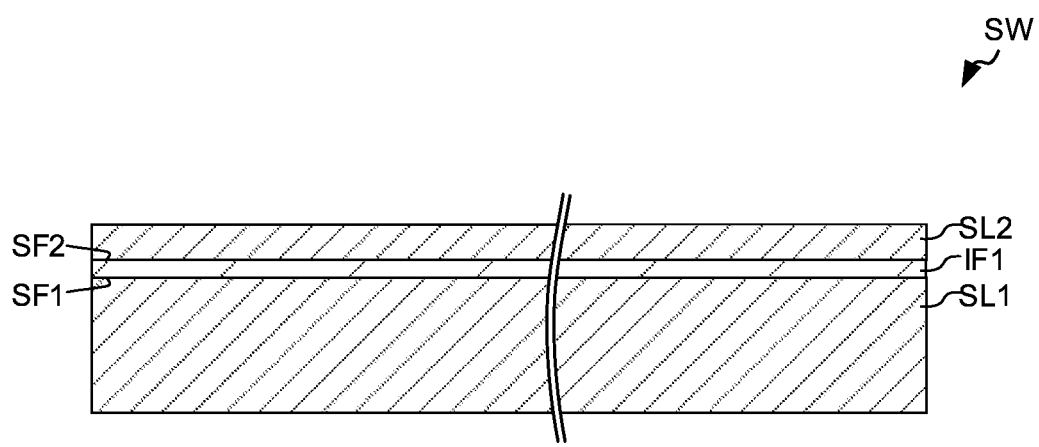
FIG. 5 is a cross-sectional view showing an exemplary step included in a method of manufacturing the semiconductor device according to the first embodiment.

As shown in FIG. 5, a semiconductor wafer SW is provided. The semiconductor wafer SW may be formed or purchased as a commercial product. The semiconductor wafer SW is, for example, an SOI (Silicon On Insulator) substrate. A method of forming the SOI substrate can be appropriately selected from a known method. An example of forming the SOI substrate includes SIMOX (Separation by Implantation of Oxygen) method and smart-cut method.

The semiconductor wafer SW includes a first semiconductor layer SL1, a first insulating film IF1 formed on the first semiconductor layer SL1, and a second semiconductor layer SL2 formed on the first insulating film IF1.

The first semiconductor layer SL1 is comprised of, for example, silicon or germanium. A thickness of the first semiconductor layer SL1 is 2 μm or more and 900 μm or less. A material of the second semiconductor layer SL2 is, for example, silicone or germanium. The thickness of the second semiconductor layer SL2 is 200 nm or more and 400 nm or less. The first semiconductor layer SL1 may be polished to a desired thickness.

(2) Forming the second optical waveguide OW2

Figure 6:
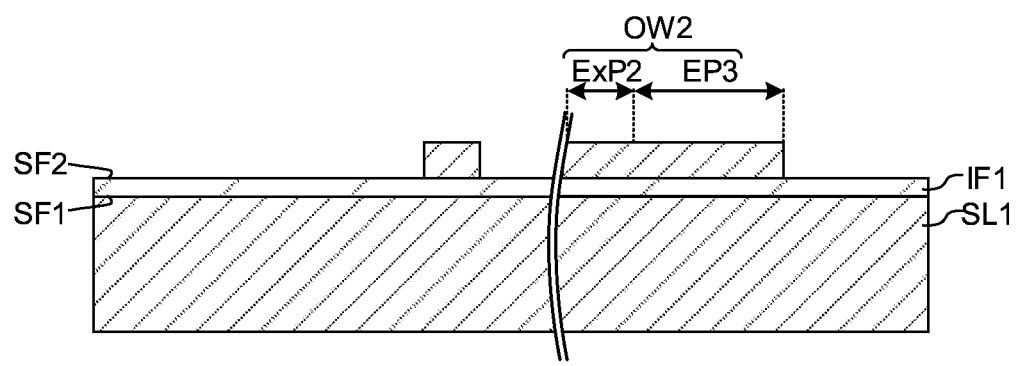
FIG. 6 is a cross-sectional view showing an exemplary step included in the method of manufacturing the semiconductor device according to the first embodiment.

As shown in FIG. 6, the second semiconductor layer SL2 is patterned to form the second optical waveguide OW2 on the insulating layer IL. A method of patterning the second semiconducting layer SL2 is performed by photolithographic and etching techniques.

(3) Forming the multilayer wiring layer MWL

Figure 7:
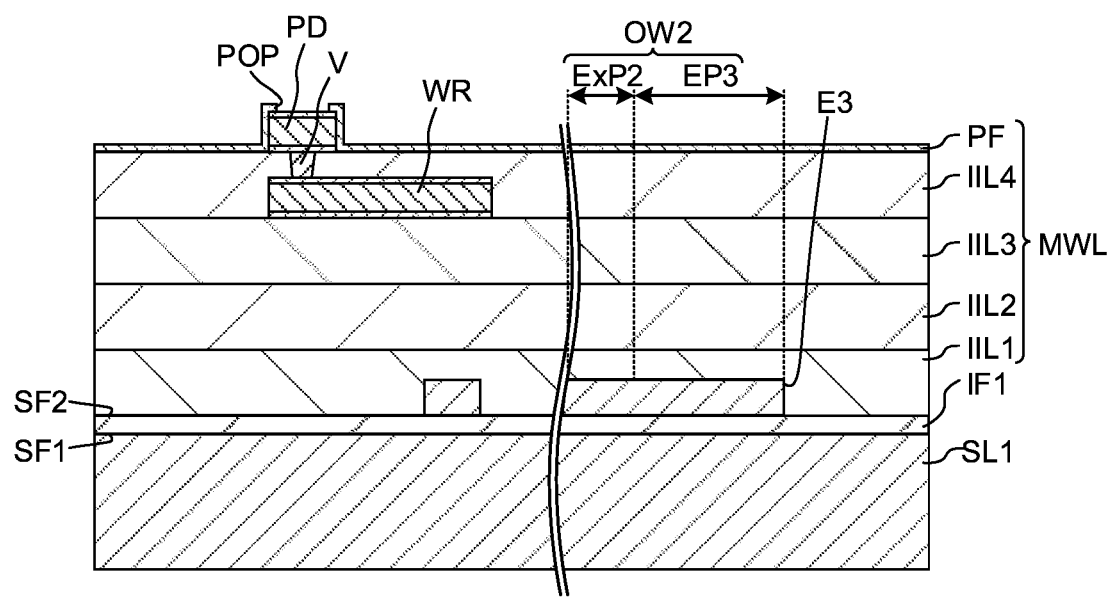
FIG. 7 is a cross-sectional view showing an exemplary step included in the method of manufacturing the semiconductor device according to the first embodiment.

As shown in FIG. 7, the multilayer wiring layer MWL is formed on the first insulating film IF1 so as to cover the second optical waveguide OW2. The forming the multilayer wiring layer MWL includes forming the first interlayer insulating layer IIL1, forming the second interlayer insulating layer IIL2, forming the third interlayer insulating layer IIL3, forming the fourth interlayer insulating layer IIL4, forming the wiring WR, forming the via V, forming the electrode pad PD, and forming the protective film PF.

The first interlayer insulating layer IIL1, the second interlayer insulating layer IIL2, the third interlayer insulating layer IIL3, the fourth interlayer insulating layer IIL4, and the protective film PF are formed by, for example, CVD method. The via V is formed by forming a through hole in the fourth interlayer insulating layer IIL4 and then embedding the through hole with a conductive material. The wiring WR is formed by forming a conductive layer on the third interlayer insulating layer IIL3 by sputtering method and then patterning the conductive layer into a desired shape. The electrode pad PD is formed by forming a conductive layer on the fourth interlayer insulating layer IIL4 by sputtering method, and then patterning the conductive layer into a desired shape.

(4) Disposing a support member SM

Figure 8:
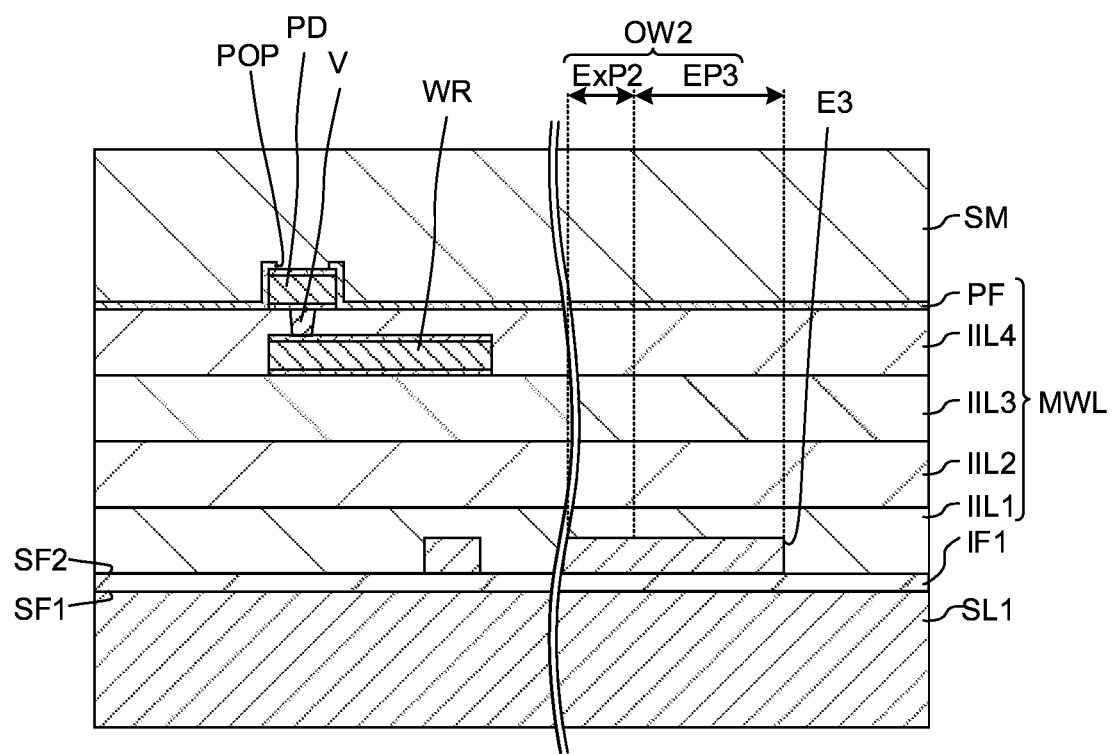
FIG. 8 is a cross-sectional view showing an exemplary step included in the method of manufacturing the semiconductor device according to the first embodiment.

As shown in FIG. 8, a support member SM is disposed on the multilayer wiring layer MWL. The support member SM may support a structure obtained in the above steps. For example, the support member SM is a stacked structure of an adhesive layer and a glass substrate. The support member SM may be a semiconductor chip CP having the second electronic circuit EC 2 and the third electronic circuit EC 3 (see FIG. 1).

(5) Forming the first optical waveguide OW1

As shown in FIG. 9, the first semiconductor layer SL1 is patterned to form the first optical waveguide OW1 on the first surface SF1 of the first insulating film IF1. In this step, the support member SM is used as a base. Patterning of the first semiconductor layer SL1 is performed by photolithography and etching techniques.

(6) Forming the second insulating film IF2

As shown in FIG. 10, the second insulating film IF2 is formed on the first surface SF1 of the first insulating film IF1 so as to cover the first optical waveguide OW1. A material of the second insulating film IF2 is resin, silicon oxide, or silicon nitride. An example of a method of forming the second insulating film IF2 include lithography, mosquito, and nanoimprinting when the material of the second insulating film IF2 is resin. For example, after a curable resin composition is provided on the first surface SF1 of the first insulating film IF1, the second insulating film IF2 may be formed by curing the curable resin composition. The curable resin composition may be a thermosetting resin composition or a photocurable resin composition. If the material of the second insulating film IF2 is silicon oxide or silicon nitride, a method of forming the second insulating film IF2 is, for example, CVD method.

Finally, by dicing the structure obtained by the above steps, a plurality of semiconductor device SD1 singulated are obtained. The optical fiber OF is disposed such that the optical fiber OF faces the second end portion EP2 of the first optical waveguide OW1 of the semiconductor device SD1. The support member SM may or may not be removed.

(Effect)

The semiconductor device SD1 according to the first embodiment includes the first optical waveguide OW1 formed on the first surface SF1 of the first insulating film IF1, and the second optical waveguide OW2 formed on the second surface SF2 of the first insulating film IF1. The second optical waveguide OW2, in plan view, overlaps with one end portion (the first end portion EP1) of the first optical waveguide OW1. Thus, between the second optical waveguide OW2 and the first optical waveguide OW1, the light can travel through the first insulating film IF1. Further, the second optical waveguide OW2, in plan view, does not overlap with the other end (the second end portion EP2) of the first optical waveguide OW1. Thus, the light transmitted from the second optical waveguide OW2 to the first optical waveguide OW1 is guided by the first optical waveguide OW1 without returning to the second optical waveguide OW2.

In the first embodiment, the thickness T1 of the first optical waveguide OW1 is greater than the thickness T2 of the second optical waveguide OW2, and the width W1 of the first optical waveguide OW1 is greater than the width W2 of the second optical waveguide OW2. If the first optical waveguide OW1 and the second optical waveguide OW2 are formed on one surface of the first insulating film IF1, the first optical waveguide OW1 and the second optical waveguide OW2 that are different in size from each other need to be formed on the one surface of the first insulating film IF1. If the sizes of the first optical waveguide OW1 and the second optical waveguide OW2 are significantly different, it is difficult to manufacture the semiconductor device. In contrast, in the first embodiment, the first optical waveguide OW1 and the second optical waveguide OW2 are respectively formed on the first surface SF1 and the second surface SF2 of the first insulating film IF1. As a consequence, the semiconductor device SD1 according to the first embodiment can be easily manufactured even if the size of the first optical waveguide OW1 and the size of the second optical waveguide OW2 are different from each other.

Further, consider a case where the material of second optical waveguide OW2 is a stress film for example, silicon nitride), and the material of the first optical waveguide OW1 is a semiconductor layer (for example, silicon). If the first optical waveguide OW1 and the second optical waveguide OW2 are formed on the one surface of the first insulating film IF1, from the viewpoint of configuring to be able to transmit light between the first optical waveguide OW1 and the second optical waveguide OW2, the first optical waveguide OW1 and the second optical waveguide OW2 are preferable formed to be in contact with each other. However, in this case, due to the second optical waveguide OW2 formed of the stress film, there is a possibility that cracks occur in the first optical waveguide OW1. On the other hand, in the semiconductor device SD1 according to the first embodiment, since the first optical waveguide OW1 and the second optical waveguide OW2 are separated from each other, there is no possibility that cracks occur due to the difference in materials, as described above. Consequently, in the first embodiment, the characteristics of semiconductor device SD1 can be improved.

[First Modification]

Figure 11:
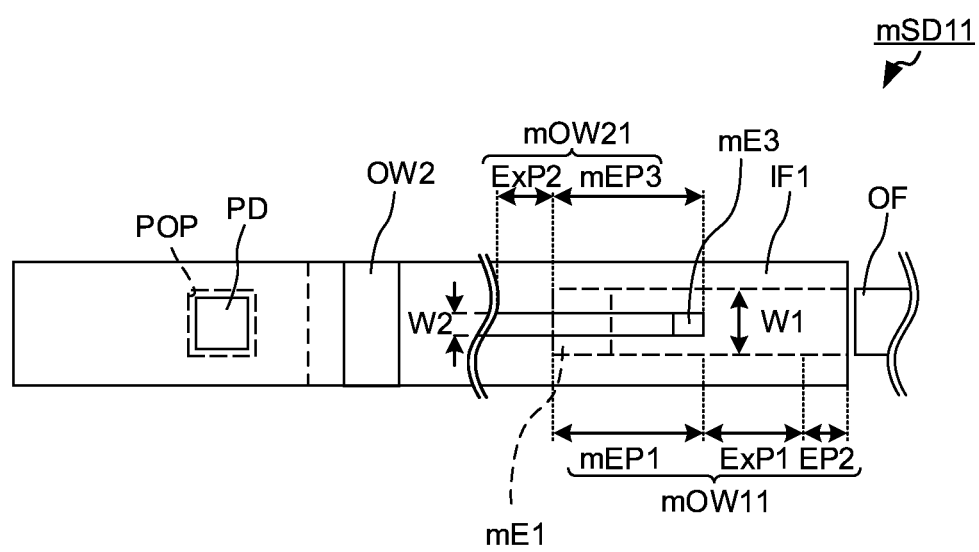
FIG. 11 is a plan view showing an exemplary configuration of a main portion of a semiconductor device according to a first modification of the first embodiment.
Figure 12:
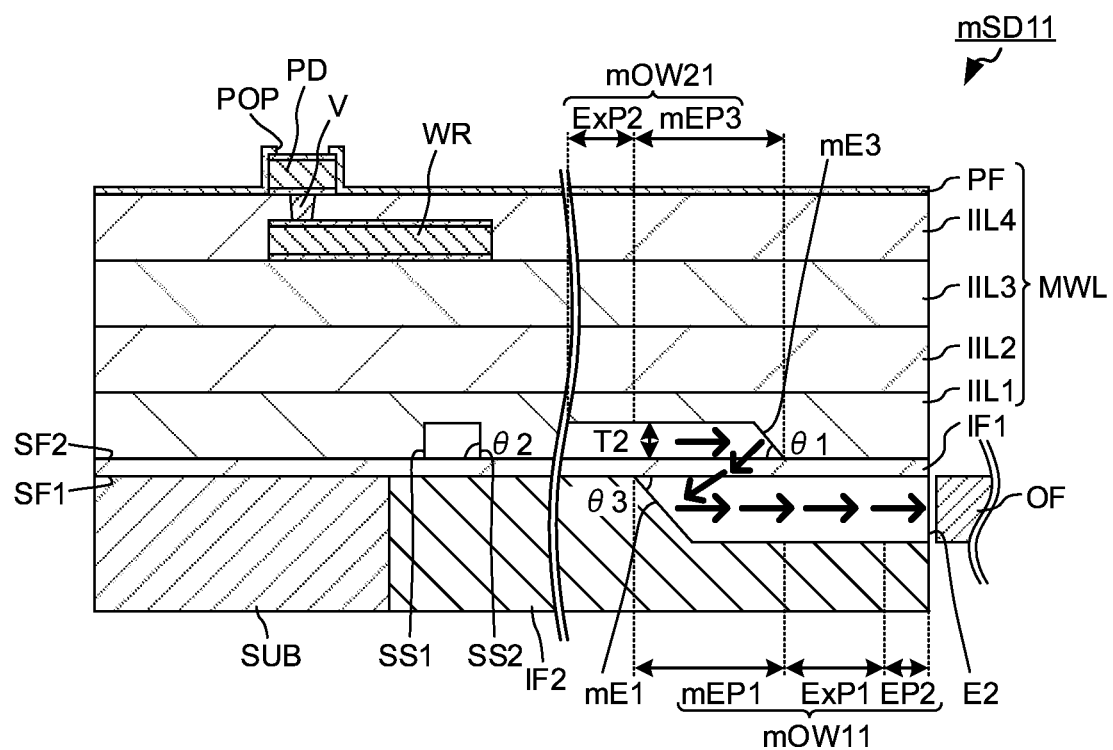
FIG. 12 is a cross-sectional view showing an exemplary configuration of the main portion of the semiconductor device according to the first modification of the first embodiment.

FIG. 11 is a plan view showing an exemplary configuration of a main portion of a semiconductor device mSD11 according to a first modification of the first embodiment. FIG. 12 is a cross-sectional view showing an exemplary configuration of a main portion of the semiconductor device mSD11 according to the first modification of the first embodiment. In FIG. 12, an arrow indicates a traveling direction of the light, a thickness of the arrow indicates the amount of light.

The semiconductor device mSD11 includes a first optical waveguide mOW11 and a second optical waveguide mOW21. In the first modification, a first angle θ1 formed by the third end portion (end surface) mE3 of the second optical waveguide mOW21 and the second surface SF2 of the first insulating film IF1 is smaller than a second angle θ2 formed by the first side surface SS1 or the second side surface SS2 of the second optical waveguide mOW21 and the second surface SF2 of the first insulating film IF1. Further, the first edge mE1 of the first optical waveguide mOW11 is inclined along the third edge mE3 of the second optical waveguide mOW21. That is, the third angle θ3 formed by the first edge (end face) mE1 of the first optical waveguide mOW11, the first surface SF1 of the first insulating film IF1 is about the same as the first angle θ1.

The first angle θ1 and the third angle θ3 are preferably, for example, 35° or more and 55° or less. At this instance, the first edge mE1 of the first optical waveguide mOW11 and the third edge mE3 of the second optical waveguide mOW21 can be easily formed by a wet etching method. A first edge mEP1 of the first optical waveguide mOW11, when processed by a wet etching method and the third edge mEP3 of the second optical waveguide mOW21, since the etching rate is different by the crystal orientation, the first angle θ1 and third angle θ3, tends to be 35° or more and 55° or less. Thus, it is possible to easily realize a desired inclination angle. At this instance, after processing, a crystal plane of the first edge mE1 and a crystal plane of the third edge mE3 tend to be the (111) plane.

The second angle θ2 is not particularly limited. The second angle θ2 is, for example, more than 55°, and 90° or less.

A method of manufacturing the semiconductor device SD1 according to first modification further includes processing the first end portion mEP1 of the first optical waveguide mOW11, and processing the third end portion mEP3 of the second optical waveguide mOW21. A method of processing the first end portion mEP1 and a method of processing the third end portion mEP3, for example, are a wet etching method or a dry etching method. As described above, the method of processing the first end portion mEP1 and the method of processing the third end portion mEP3 are preferable wet etching method.

The first end portion mEP1 of the first optical waveguide mOW11 may be masked to cover portions other than the first end portion mEP1, and the first end portion mEP1 may be treated with an etchant. The material of the mask is, for example, silicone dioxide (SiO$_2$). An example of the etching solution includes potassium hydroxide (KOH) aqueous solution, tetramethylammonium hydroxide (TMAH) aqueous solution, ethylenediamine-pyrocatechol (EDP) aqueous solution, hydrazine (N$_2$H) aqueous solution, sodium hydroxide aqueous solution and cesium hydroxide (CsOH) aqueous solution. Incidentally, the method of processing the third end portion mEP3 of the second optical waveguide mOW21 is the same.

In the first modification, as indicated by an arrow in FIG. 12, light propagating in the second optical waveguide mOW21 is reflected at the third end mE3 and is reflected at the first edge mE1, thereby transmitting light between second optical waveguide mOW21 and the first optical waveguide mOW11. Compared with the transmission of light by evanescent coupling, the propagation loss of light can be further reduced. As a result, the characteristics of the semiconductor device mSD11 can be further enhanced.

Further, in the semiconductor device mSD11 according to first modification, the transmission of light between the first optical waveguide mOW11 and the second optical waveguide mOW21 is performed by reflecting light as described above. Therefore, the thickness of the first insulating film IF1 is not particularly limited. For example, the thickness of the first insulating film IF1 is, for example, 100 nm or more and 3 μm or less.

[Second Modification]

Figure 13:
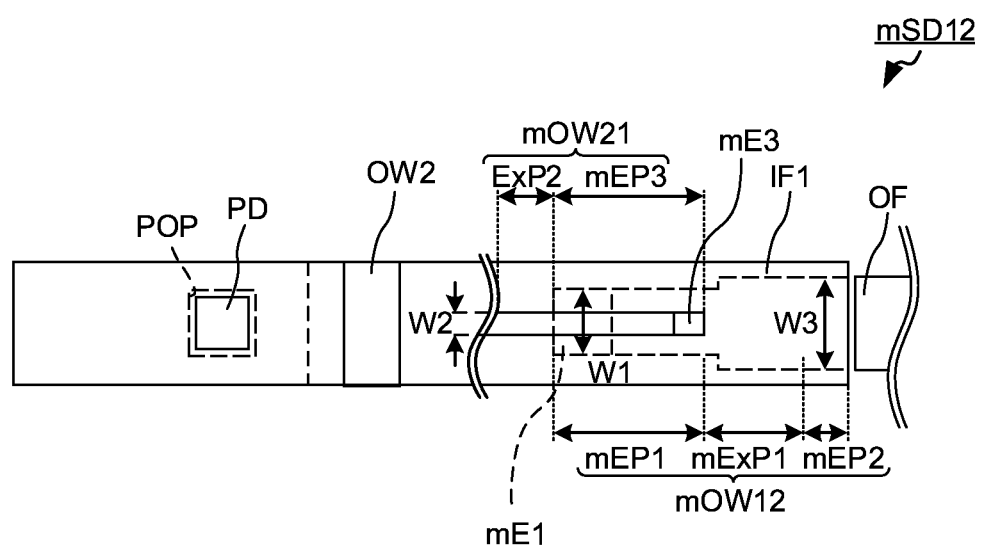
FIG. 13 is a plan view showing an exemplary configuration of a main portion of a semiconductor device according to a second modification of the first embodiment.
Figure 14:
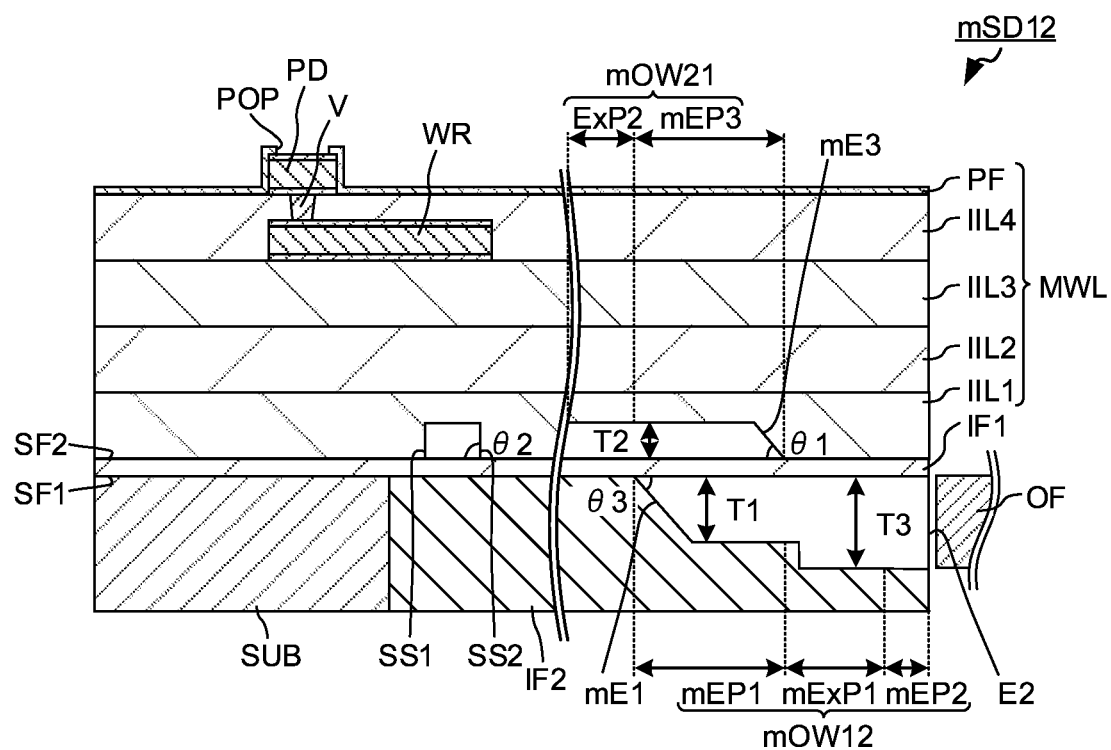
FIG. 14 is a cross-sectional view showing an exemplary configuration of the main portion of the semiconductor device according to second modification of the first embodiment.

FIG. 13 is a plan view showing an exemplary configuration of a main portion of a semiconductor device mSD12 according to a second modification of the first embodiment. FIG. 14 is a cross-sectional view showing an exemplary configuration of a main portion of the semiconductor device mSD12 according to the second modification of the first embodiment.

The semiconductor device mSDs12 includes a first optical waveguide mOW12 and a second optical waveguide mOW21. The semiconductor device mSD12 according to the second modification differs from the semiconductor device mSD11 according to the first modification in the configuration of the first optical waveguide mOW12. The first optical waveguide mOW12 includes a first end portion mEP1, a first extending portion mExP1, and a second end portion mEP2.

The first end portion mEP1 has a first width W1 and a first thickness T1. On the other hand, the second end portion mEP2 has a third width W3 and a third thickness T3. A portion, of the first extending portion mExP1, adjoining the first end portion mEP1 has a first width W1 and a first thickness T1. The remainder of the first extension mExP1 has a third width W3 and a third thickness T3. The third width W3 is greater than the first width W1 and the third thickness T3 is greater than the first thickness T1. The third width W3 and the third thicknesses T3 are appropriately adjusted in accordance with the size of the optical fiber OF.

In the second modification, the size of the second end portion mEP2 is the input and output portion of the light in the first optical waveguide mOW12, can be appropriately adjusted in accordance with the size of the optical fiber OF. Thus, it is possible to increase the coupling efficiency between the first optical waveguide mOW12 and the optical fiber OF. Consequently, the characteristics of the semiconductor device mSD12 can be further enhanced.

[Second Embodiment]

An optoelectronic hybrid device LE2 and a semiconductor device SD2 according to a second embodiment differ from the optoelectronic hybrid device LE1 and the semiconductor device SD1 according to the first embodiment mainly in that the semiconductor device SD2 includes a third optical waveguide OW3. Therefore, the same constituent elements as those of the semiconductor device SD1 according to the first embodiment are denoted by the same reference numerals, and descriptions thereof are omitted.

(Circuit Configuration of Optoelectronic Hybrid Device)

The optoelectronic hybrid device LE2 according to the second embodiment includes a first electronic circuit EC1, a light source LS, an IC chip CP, and a semiconductor device SD2 (see FIG. 1).

(Configuration of Semiconductor Device)

Figure 15:
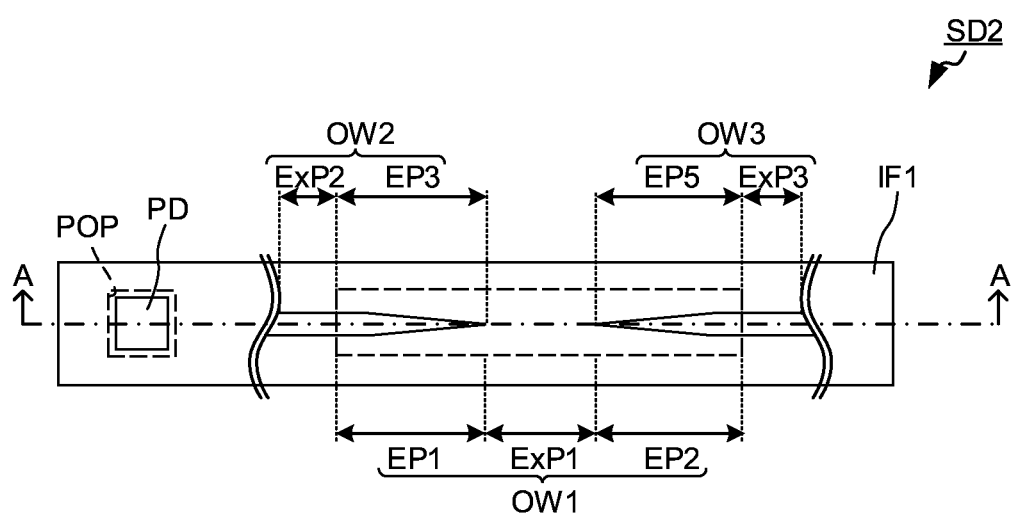
FIG. 15 is a plan view showing an exemplary configuration of a main portion of a semiconductor device according to a second embodiment.
Figure 16:
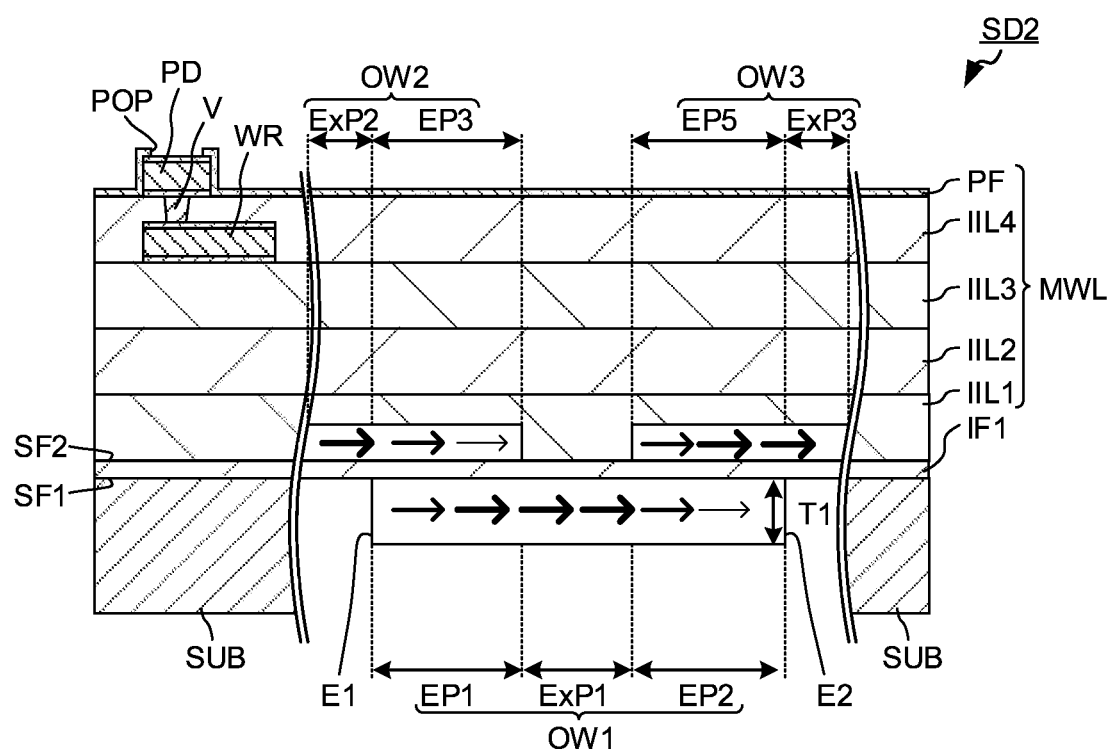
FIG. 16 is a cross-sectional view showing an exemplary configuration of the main portion in the semiconductor device according to the second embodiment.

FIG. 15 is a plan view showing an exemplary configuration of a main portion in the semiconductor device SD2 according to the second embodiment. FIG. 16 is a cross-sectional view showing an exemplary configuration of the main portion in the semiconductor device SD2 according to the second embodiment. FIG. 16 is a cross-sectional view taken along line A-A of FIG. 15. In FIG. 16, an arrow indicates a traveling direction of the light, a thickness of the arrow indicates the amount of light.

The semiconductor device SD2 includes a semiconductor substrate SUB, a first insulating film IF1, a first optical waveguide OW1, a second optical waveguide OW2, a third optical waveguide OW3, a second insulating film IF2, and a multilayer wiring layer MWL. In FIG. 15, from the viewpoint of legibility, a portion of multilayer wiring layer MWL is omitted.

The first insulating film IF1 supports the first optical waveguide OW1, the second optical waveguide OW2 and the third optical waveguide OW3. The first insulating film IF1 is a cladding layer for substantially confining the light propagating inside the first optical waveguide OW1, the second optical waveguide OW2 and the third optical waveguide OW3 to the inside of the first optical waveguide OW1, the second optical waveguide OW2 and the third optical waveguide OOG, respectively.

The first optical waveguide OW1, at the first end portion EP1, is configured to allow light to travel between the first optical waveguide OW1 and the second optical waveguide OW2. The first optical waveguide OW1 is configured to allow light to travel between the first optical waveguide OW1 and the third optical waveguide OW3 at the second end portion EP2. In the second embodiment, through the first optical waveguide OW1, the light from the second optical waveguide OW2 may transmit to the third optical waveguide OW3. The first optical waveguide OW1, in plan view, the first end portion EP1 overlaps with an end portion (third end portion EP3) of the second optical waveguide OW2, and the second end EP2 overlaps with an end portion (described later fourth end portion EP4) of the third optical waveguide OW3. Therefore, in the second embodiment, the positions of the first end portion EP1 and the second end portion EP2 of the first optical waveguide OW1 in the semiconductor device SD2 are not particularly limited.

The second end portion EP2 of the first optical waveguide OW1, in plan view, may overlap with an entire of the end portion (fourth end portion EP4) of the third optical waveguide OW3, or the end portion (fourth end EP4) of the third optical waveguide OW3. From the viewpoint of reducing the propagation loss of light during the first optical waveguide OW1 and the third optical waveguide OW3, the first end portion EP1 of the first optical waveguide OW1, in plan view, preferably overlaps the entire of the end portion (fourth end portion EP4) of the third optical waveguide OW3.

The third optical waveguide OW3 is formed on the second surface SF2 of the first insulating film IF1. The third optical waveguide OW3 includes a fifth end portion EP5, a sixth end portion (not shown) and a third extending portion ExP3. The fifth end portion EP5, the sixth end portion (not shown) and the third extending portion ExP3 may be formed integrally with each other as a single member, or separately from each other. In the second embodiment, the fifth end portion EP5, the sixth end portion (not shown), and the third extending portion ExP3 are integrally formed with each other as a single member.

A width of the fifth end portion EP5 may be the same as or different from a width of third extending portion ExP3. The width of the fifth end portion EP5 may vary toward an end of the fifth end portion EP5 or may be constant. A planar shape of an upper surface of the fifth end portion EP5 may be triangular, it may be trapezoidal. A thickness of the fifth end portion EP5 may be the same as or different from a thickness of the third extending portion ExP3. In the second embodiment, a thickness of the fifth end portion EP5 is the same as the thickness of the third extending portion ExP3.

The third extending portion ExP3 is formed between the fifth end portion EP5 and the sixth end portion (not shown). A position and a shape of the third extending portion ExP3 are not particularly limited. The shape of the third extending portion ExP3 may be a straight shape or a curved shape in plan view. The third extending portion ExP3 may include a bent portion.

The third optical waveguide OW3 is a path through which light can propagate (travel). The third optical waveguide OW3 is configured to allow light to travel between the first optical waveguide OW1 and the third optical waveguide OW3. In the second embodiment, examples such as a thickness, a material and a shape of the third optical waveguide OW3 are similar to the second optical waveguide OW2, except at a position.

The third optical waveguide OW3, in plan view, overlaps with an end portion of the first optical waveguide OW1, and does not overlap another end portion of the first optical waveguide OW1. The fifth end portion EP5 of the third optical waveguide OW3, in plan view, overlaps with the second end portion EP2 of the first optical waveguide OW1. Thus, the light in the first optical waveguide OW1, at the fifth end portion EP5, is transmitted to the third optical waveguide OW3.

The multilayer wiring layer MWL is formed on the first insulating film IF1 such that the multilayer wiring layer MWL covers the second optical waveguide OW2 and the third optical waveguide OW3.

(Optical Path in Semiconductor Device)

Here, the optical path in the semiconductor device SD2 according to the second embodiment will be described. For example, in the semiconductor device SD2, the optical path when the light emitted from the light source propagates through the second optical waveguide OW2, the first optical waveguide OW1, and the third optical waveguide OW3 will be described. In the second embodiment, as indicated by an arrow in FIG. 16, the evanescent coupling causes the light emitted from the light source to move from the second optical waveguide OW2 to the first optical waveguide OW1 (see FIG. 4) and then to move from the first optical waveguide OW1 to the third optical waveguide OW3 by the evanescent coupling as well.

(Method of Manufacturing Semiconductor Device)

Next, an exemplary method of manufacturing the semiconductor device SD2 according to the second embodiment will be described. FIGS. 17 to 21 are cross-sectional views showing exemplary steps included in the method of manufacturing the semiconductor device SD2.

Figure 20:
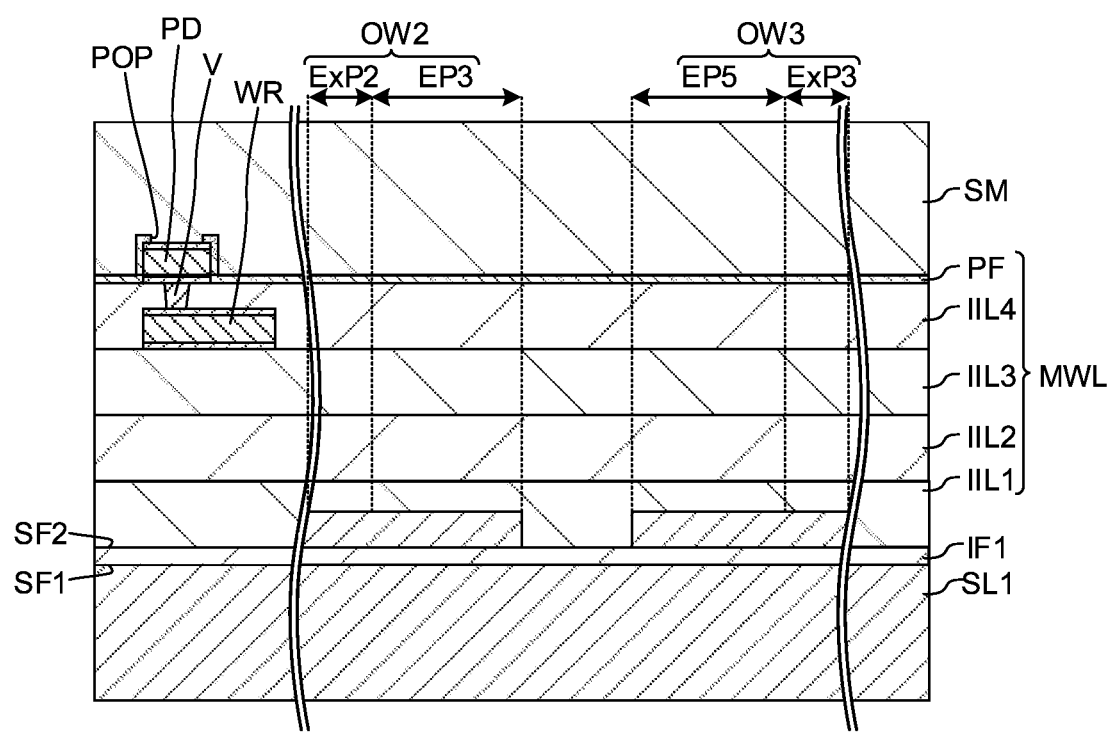
FIG. 20 is a cross-sectional view showing an exemplary step included in the method of manufacturing the semiconductor device according to the second embodiment.
Figure 21:
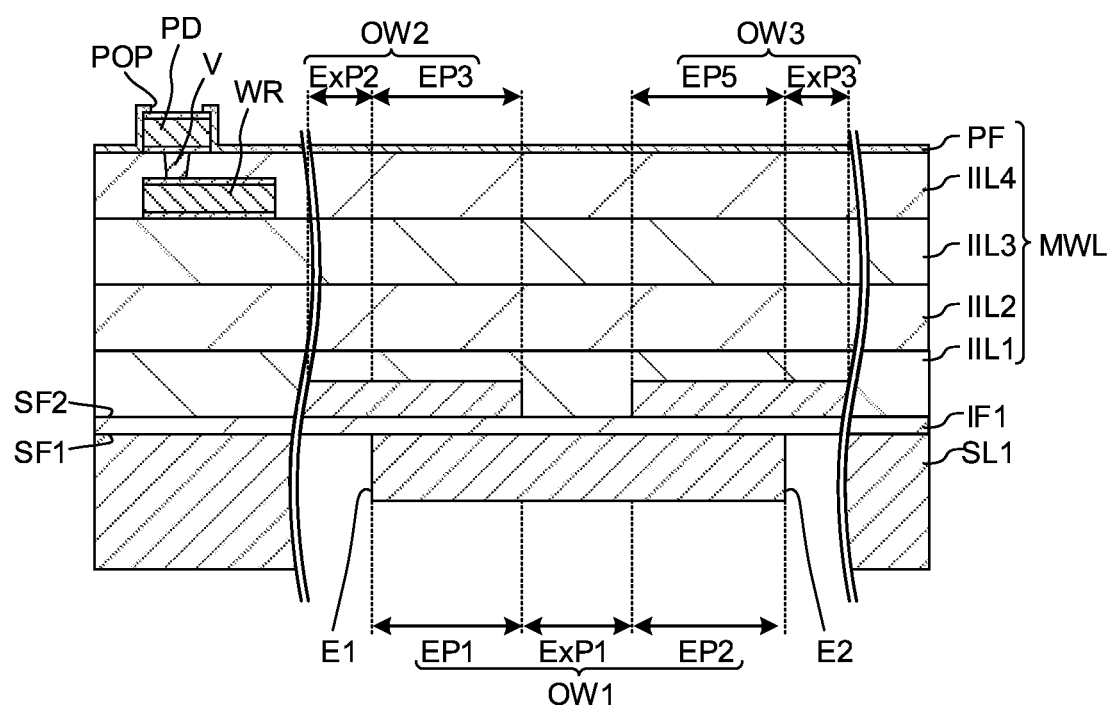
FIG. 21 is a cross-sectional view showing an exemplary step included in the method of manufacturing the semiconductor device according to the second embodiment.

The method of manufacturing the semiconductor device SD2 includes (1) providing a semiconductor wafer SW (see FIG. 17), (2) forming the second optical waveguide OW2 and the third optical waveguide OW3 (see FIG. 18), (3) forming the multilayer wiring layer MWL (see FIG. 19), (4)

disposing the support member SM (see FIG. 20), and (5) forming the first optical waveguide OW1 (see FIG. 21).

(1) Providing of a semiconductor wafer SW

Figure 17:
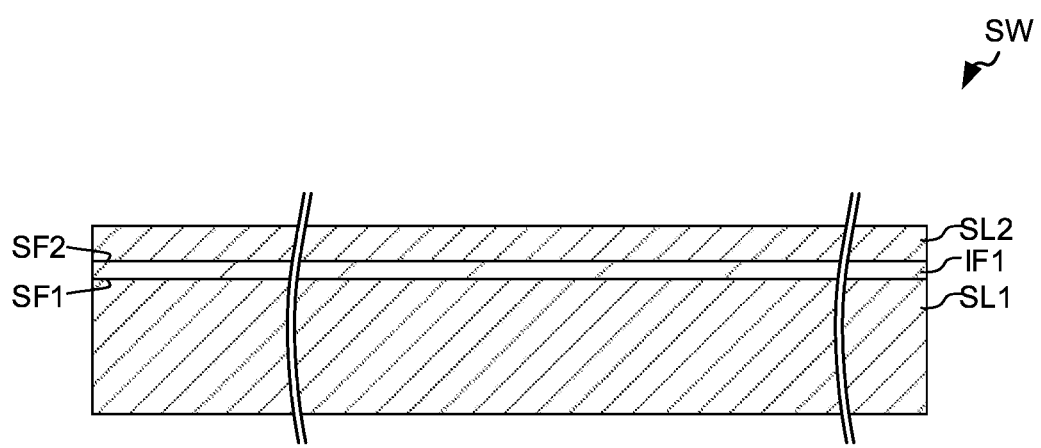
FIG. 17 is a cross-sectional view showing an exemplary step included in a method of manufacturing the semiconductor device according to the second embodiment.

As shown in FIG. 17, a semiconductor wafer SW is provided.

(2) Forming the second optical waveguide OW2 and the third optical waveguide OW3

Figure 18:
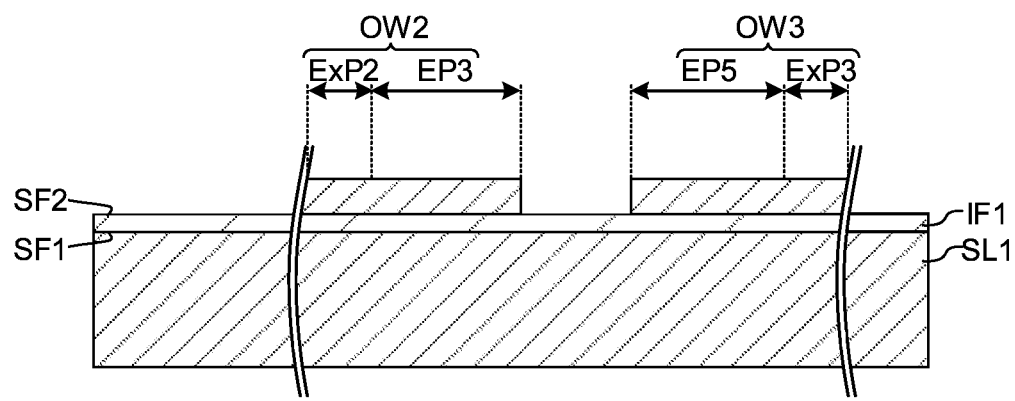
FIG. 18 is a cross-sectional view showing an exemplary step included in the method of manufacturing the semiconductor device according to the second embodiment.

As shown in FIG. 18, the second semiconductor layer SL2 is patterned to form the second optical waveguide OW2 and the third optical waveguide OW3 on the second surface SF2 of the first insulating film IF1.

(3) Forming the multilayer wiring layer MWL

Figure 19:
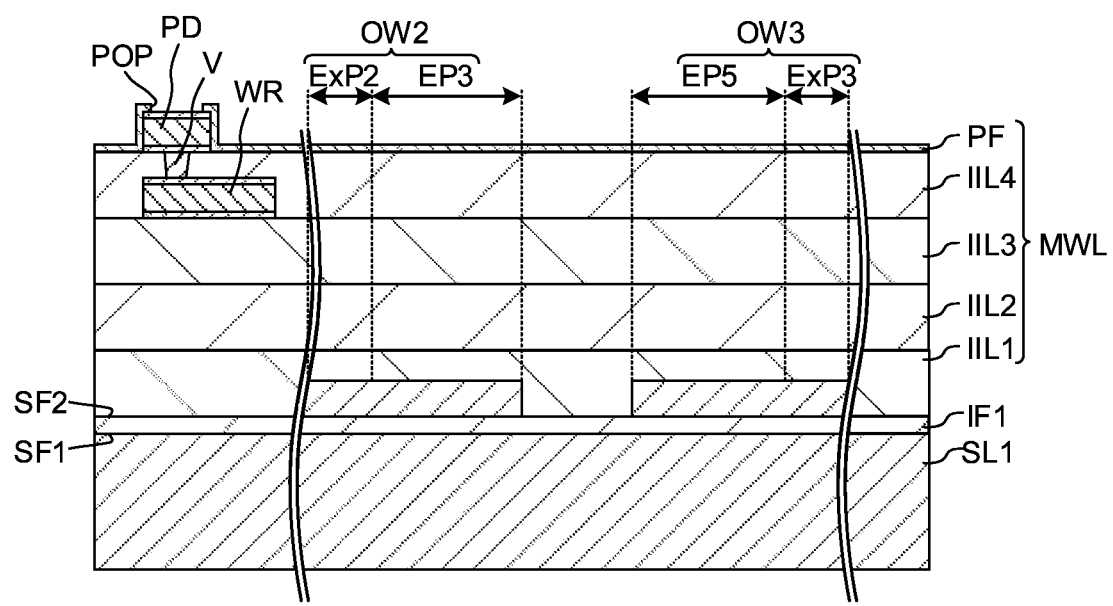
FIG. 19 is a cross-sectional view showing an exemplary step included in the method of manufacturing the semiconductor device according to the second embodiment.

As shown in FIG. 19, the multilayer wiring layer MWL is formed on the first insulating film IF1 so as to cover the second optical waveguide OW2 and the third optical waveguide OW3.

(4) Disposing the support member SM

As shown in FIG. 20, the support member SM is disposed on the multilayer wiring layer MWL.

(5) Forming the first optical waveguide OW1

Then, as shown in FIG. 21, the first semiconductor layer SL1 is patterned to form the first optical waveguide OW1 on the first surface SF1 of the first insulating film IF1.

Finally, by dicing the structures obtained by the above steps, a plurality of semiconductor device SD2 singulated are obtained. The support member SM may or may not be removed.

(Effect)

The second embodiment has the same effects as the first embodiment. In the second embodiment, the semiconductor device SD2 includes the first optical waveguide OW1 formed on the first surface SF1 of the first insulating film IF1, and the second optical waveguide OW2 and the third optical waveguide OW3 formed on the second surface SF2 of the first insulating film IF1. Thus, even when the forming step of the first optical waveguide OW1 and the forming step of the second optical waveguide OW2 and the third optical waveguide OW3 differ from each other, each of the first optical waveguide OW1, the second optical waveguide OW2, and the third optical waveguide OW3 can be formed in the desired forming condition. For example, only the optical waveguide for optical transmission may be formed on the second surface SF2 of the first insulating film IF1, and an optical element such as a optical modulator and an optical amplifier may be formed on the first surface SF1 of the first insulating film IF1. As a result, the semiconductor device SD2 can be manufactured by desired condition for each of the constituent elements of the semiconductor device SD2. Further, by forming the optical element in the vicinity of the large first optical waveguide OW1, it is possible to reduce the effect of positional deviation between the optical element and the first optical waveguide OW1. As a result, the characteristics of the semiconductor device SD2 can be enhanced.

[Third Embodiment]

An optoelectronic hybrid device LE3 and a semiconductor device SD3 according to a third embodiment differ from the optoelectronic hybrid device LE1 and the semiconductor device SD1 according to the first embodiment mainly in that the semiconductor device SD2 includes a reflective member RM and a fourth optical waveguide OW4. Therefore, the same constituent elements as those of the semiconductor device SD1 according to the first embodiment are denoted by the same reference numerals, and descriptions thereof are omitted.

(Circuit Configuration of Optoelectronic Hybrid Device)

The optoelectronic hybrid device LE3 according to the third embodiment includes a first electronic circuit, a light source LS, an IC chip CP, and a semiconductor device SD3 (see FIG. 1).

(Configuration of Semiconductor Device)

Figure 22:
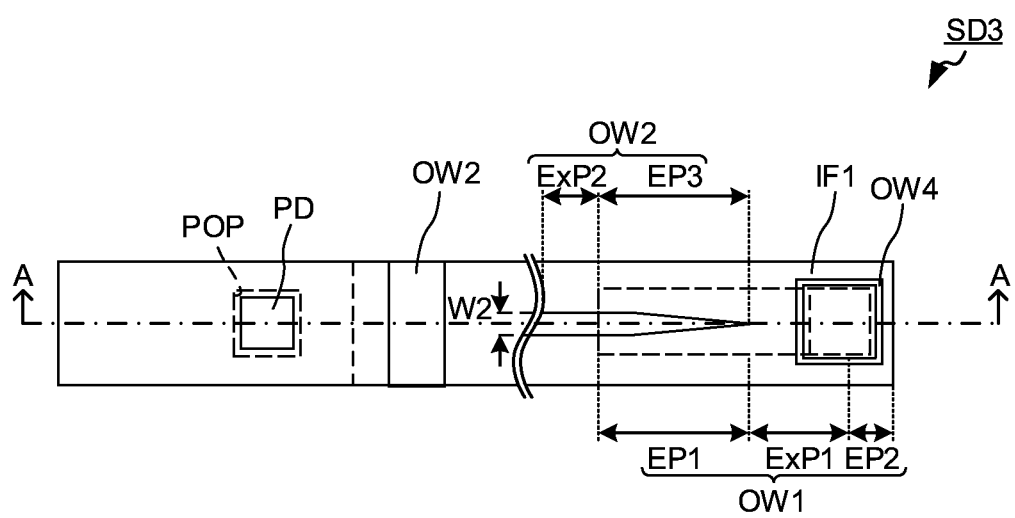
FIG. 22 is a plan view showing an exemplary configuration of a main portion of a semiconductor device according to a third embodiment.
Figure 23:
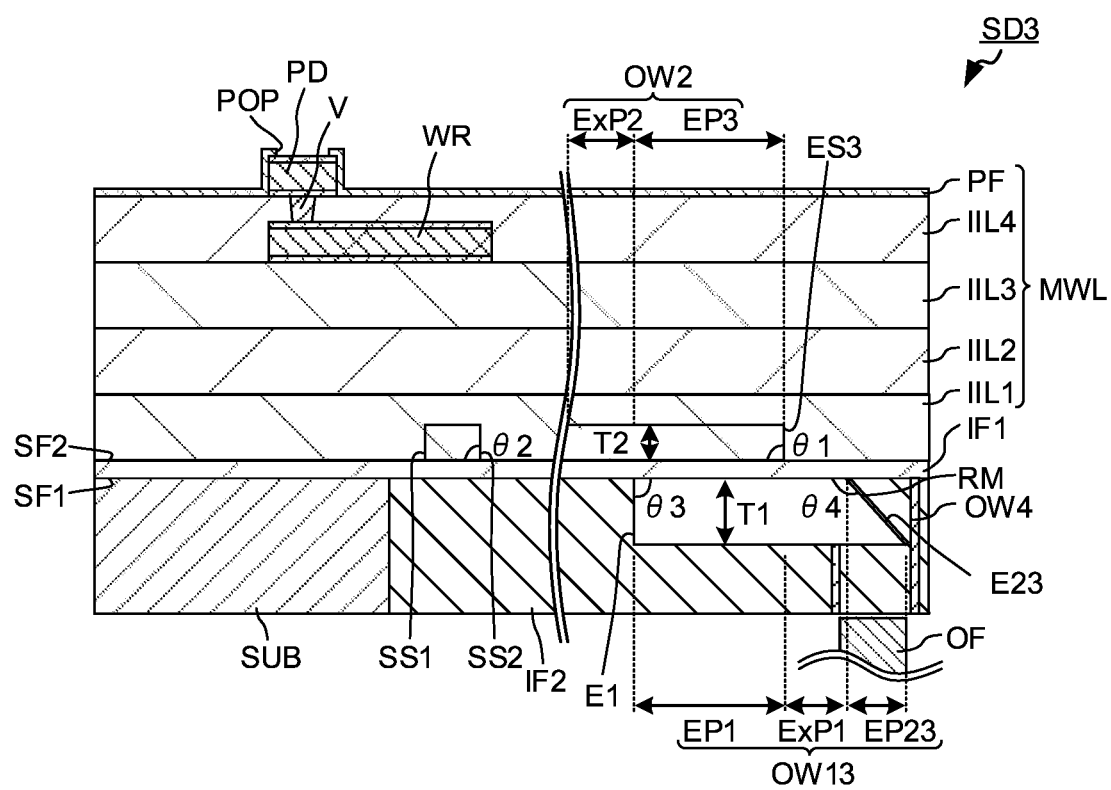
FIG. 23 is a cross-sectional view showing an exemplary configuration of the main portion of the semiconductor device according to the third embodiment.

FIG. 22 is a plan view showing an exemplary configuration of a main portion of a semiconductor device SD3 according to the third embodiment. FIG. 23 is a cross-sectional view showing an exemplary configuration of the main portion of the semiconductor device SD3 according to the third embodiment. FIG. 23 is a cross-sectional view taken along line A-A of FIG. 22.

The semiconductor device SD3 includes a semiconductor substrate SUB, a first insulating film IF1, a first optical waveguide OW13, a reflective member RM, a fourth optical waveguide OW4, a second optical waveguide OW2, a second insulating layer IL 2, and a multilayer wiring layer MWL. In FIG. 22, from the viewpoint of legibility, the multilayer wiring layer MWL is omitted.

The first optical waveguide OW13 is formed on the first surface SF1 of the first insulating film IF1. The first optical waveguide OW13 includes a first end portion (one end portion) EP1, a second end portion (another end portion) EP23 and the first extending portion ExP1.

The second edge E23 of the second end portion EP23 is inclined with respect to a normal line of the first surface SF1 of the first insulating film IF1. The fourth angle θ4 formed by the second edge E23 of the second end portion EP23 and the first surface SF1 is greater than the third angle θ3 formed by the first edge E1 of the second end portion EP23 and the first surface SF1. Thus, the second edge E23 of the second end portion EP23 can reflect the light propagating in the first optical waveguide OW1 away from the first surface SF1 of the first insulating film IF1. The fourth angle θ4 is preferably, for example, 125° or more and 145° or less. At this instance, the second edge E23 of the first optical waveguide OW13, by a wet etching method, can be easily formed.

The reflective member RM is formed on the second edge E23 of the first optical waveguide OW13. The material and thickness of the reflective member RM is not particularly limited as long as it can reflect light propagating in the first optical waveguide OW13. The reflective member RM is, for example, a single film comprised of metal. An example of the metal includes Al, Ag, Au, Cr and SiCr. From the viewpoint of preventing deterioration, the reflective member RM may be coated with a protective film comprised of SiO2 or SiN. A thickness of the reflective member RM is, for example, 5 nm or more and 20 nm or less.

The fourth optical waveguide OW4 is formed in the second insulating film IF2. The fourth optical waveguide OW4 guides the reflected light from the reflective member RM, away from the first surface SF1 of the first insulating film IF1. The configuration of the fourth optical waveguide OW4 is not particularly limited as long as the above-mentioned function can be obtained. The fourth optical waveguide OW4 is formed in a trench formed in the second insulating film IF2. The material of the fourth optical waveguide OW4 has a refractive index greater than a refractive index of the material of the second insulating film IF2. The material of the fourth optical waveguide OW4 is, for example, silicon nitride. In the third embodiment, the fourth optical waveguide OW4 (the trench), in a plan view, is formed such that the fourth optical waveguide OW4 surrounds the reflective member RM. A planar shape of the fourth optical waveguide OW4 (the trench), for example, a square shape or a circular shape.

(Optical Path in Semiconductor Device)

Here, the optical path in the semiconductor device SD3 according to the third embodiment will be described. For example, in the semiconductor device SD3, the light emitted from the light source, through the second optical waveguide OW2 and the first optical waveguide OW13, the optical path until reaching the optical fiber OF will be described.

Figure 24:
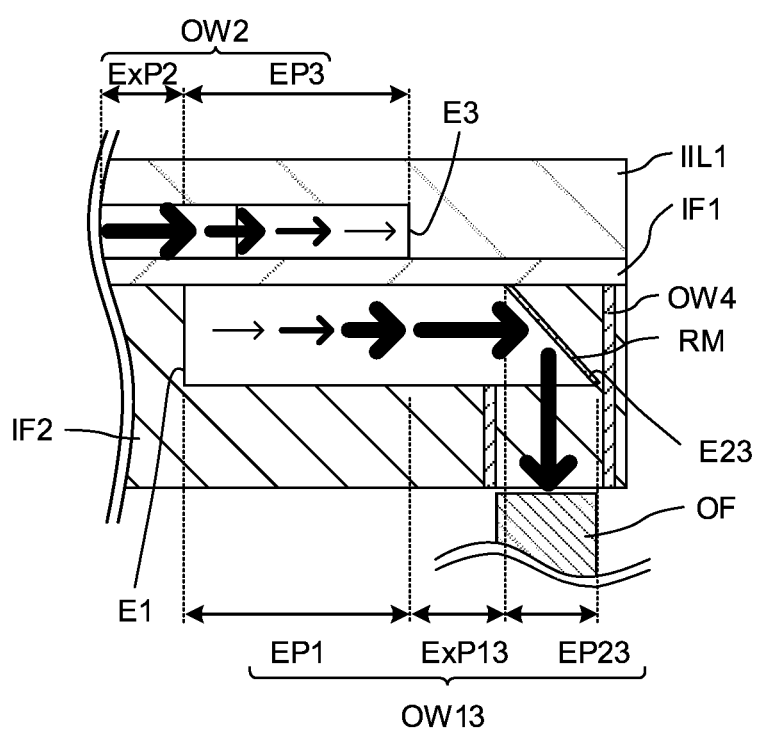
FIG. 24 is a cross-sectional view showing an optical path in the semiconductor device according to the third embodiment.

FIG. 24 is a cross-sectional view showing an optical path in the semiconductor device SD3 according to the third embodiment. In FIG. 24, an arrow indicates a traveling direction of the light, a thickness of the arrow indicates the amount of light. In the third embodiment, the first optical waveguide OW13 has a function as a spot-size converter.

As shown in FIG. 24, in the semiconductor device SD3 according to the third embodiment, the light transmitted from the second optical waveguide OW2 to the first optical waveguide OW1 reaches the reflective member RM formed on the second edge E23 of the first optical waveguide OW1 along the first surface SF1 of the first insulating film IF1. Light reaching the reflective member RM is reflected in a direction away from the first surface SF1 of the first insulating film IF1. Reflected light from the reflective member RM is emitted from the surface of the first optical waveguide OW1, by the fourth optical waveguide OW4, is guided to the optical fiber OF.

(Method of Manufacturing Semiconductor Device)

Next, an exemplary method of manufacturing the semiconductor device SD3 according to the third embodiment will be described. FIGS. 25 to 28 are cross-sectional views showing exemplary steps included in the method of manufacturing the semiconductor device SD3.

Figure 27:
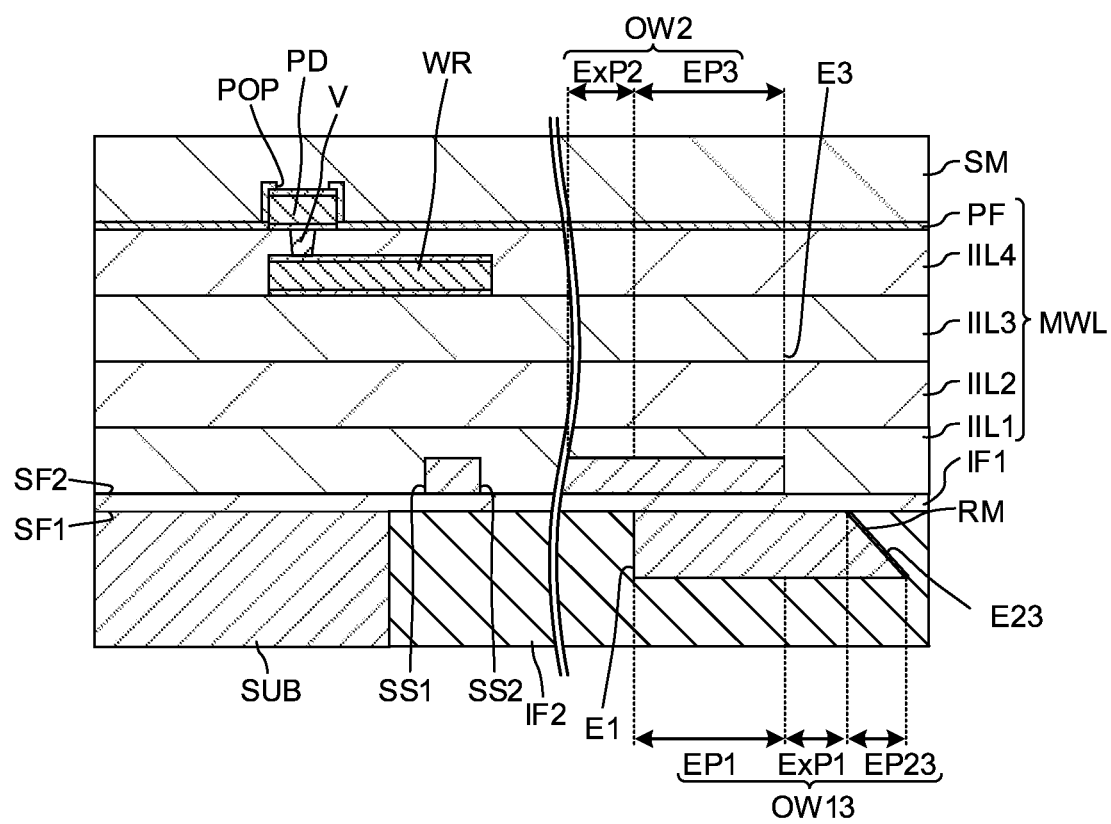
FIG. 27 is a cross-sectional view showing an exemplary step included in the method of manufacturing the semiconductor device according to the third embodiment.
Figure 28:
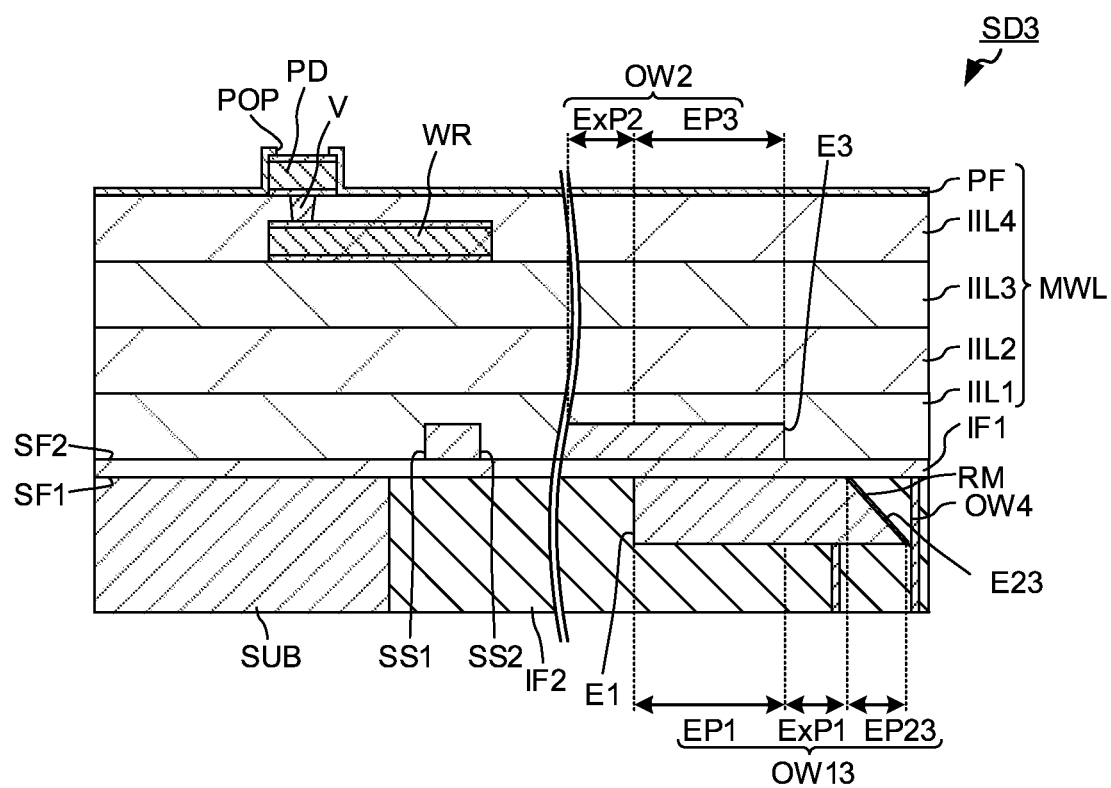
FIG. 28 is a cross-sectional view showing an exemplary step included in the method of manufacturing the semiconductor device according to the third embodiment.

The method of manufacturing the semiconductor device SD3 includes (1) providing a semiconductor wafer SW (see FIG. 5), (2) forming the second optical waveguide OW2 (see FIG. 6), (3) forming the multilayer wiring layer MWL (see FIG. 7), (4) disposing a support member SM (see FIG. 8), (5) forming the first optical waveguide OW13 (see FIG. 25), (6) forming the reflective member RM (see FIG. 26), (7) forming the second insulating film IF2 (see FIG. 27), and (8) forming the fourth optical waveguide OW4 (see FIG. 28).

As shown in FIGS. 5 to 8, similar to the method of manufacturing the semiconductor device SD1 according to the first embodiment, (1) preparing the semiconductor wafer SW, (2) forming the second optical waveguide OW2, (3) forming the multilayer wiring layer MWL, and (4) disposing the support member SM are performed.

(5) Forming the first optical waveguide OW1

Figure 25:
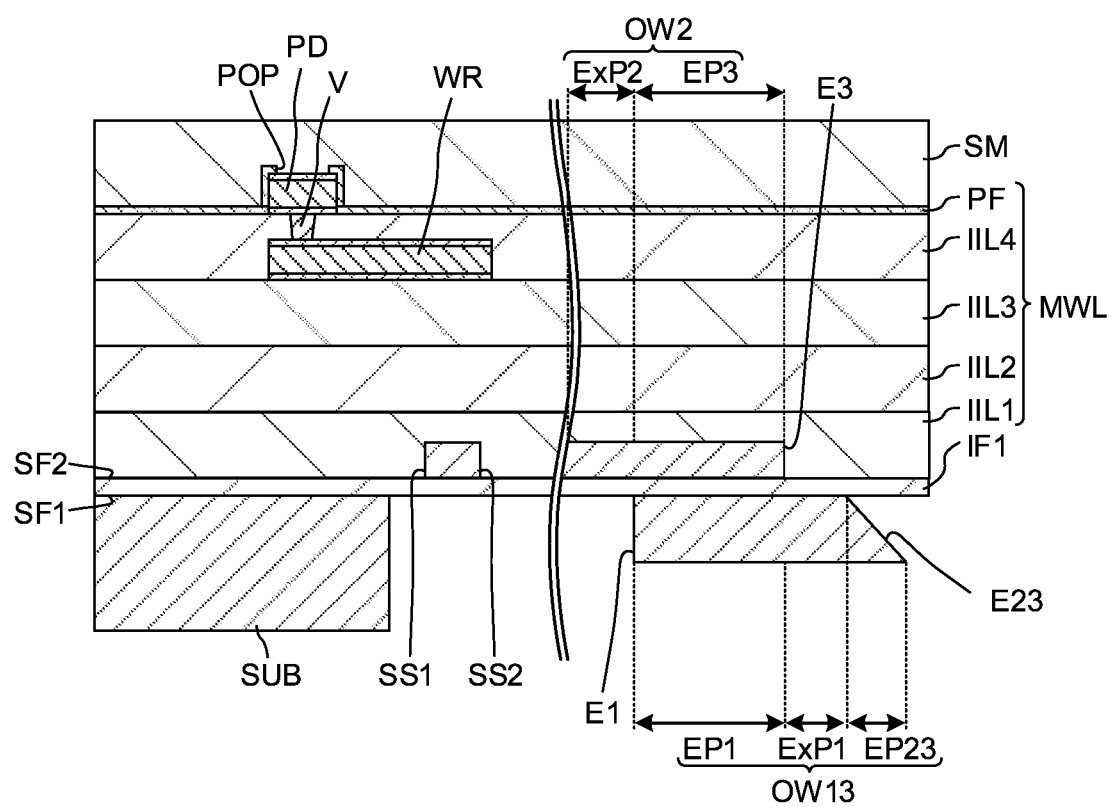
FIG. 25 is a cross-sectional view showing an exemplary step included in a method of manufacturing the semiconductor device according to the third embodiment.

As shown in FIG. 25, after patterning the first semiconductor layer SL1, by processing the second end portion EP23, the first optical waveguide OW13 is formed on the first surface SF1 of the first insulating film IF1. Patterning of the first semiconductor layer SL1 is performed by photolithography and etching techniques. The method of processing the second end portion EP23 is, for example, a wet etching method.

(6) Formation the reflective member RM

Figure 26:
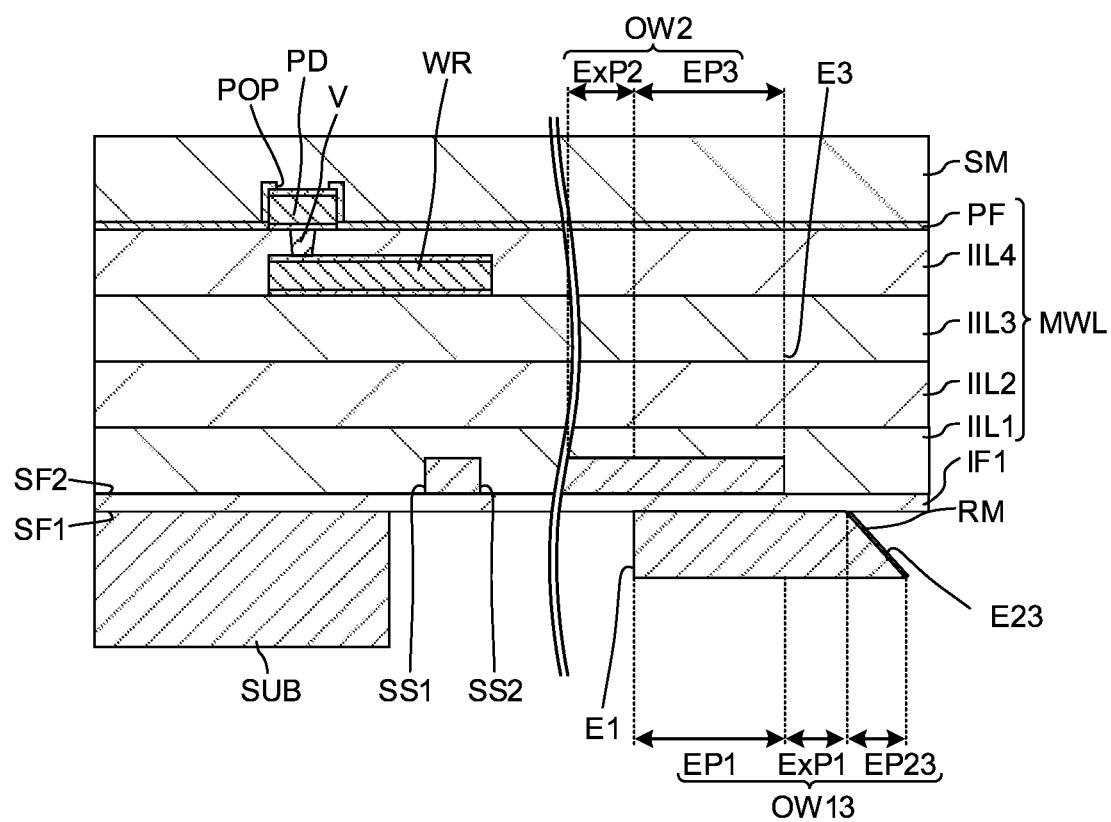
FIG. 26 is a cross-sectional view showing an exemplary step included in the method of manufacturing the semiconductor device according to the third embodiment.

As shown in FIG. 26, to form the reflective member RM on the second edge E23 of the first optical waveguide OW13. The reflective member RM is formed by, for example, sputtering method.

(7) Forming the second insulating film IF2

As shown in FIG. 27, the second insulating film IF2 is formed on the first surface SF1 of the first insulating film IF1 so as to cover the first optical waveguide OW13. The second insulating film IF2 is also formed on the reflective member RM.

(8) Forming the fourth optical waveguide OW4

As shown in FIG. 28, the fourth optical waveguide OW4 is formed in the second insulating film IF2. After forming a trench in the second insulating film IF2, the fourth optical waveguide OW4 is formed by embedding the trench with the fourth optical waveguide OW4. The method of forming the trench is, for example, by photolithography method and etching method. The method of embedding the material of the fourth optical waveguide OW4 into the trench is, for example, CVD method.

Finally, by dicing the structures obtained by the above process, a plurality of semiconductor devices SD3 singulated are obtained. The support member SM may or may not be removed.

(Effect)

An effect according to the third embodiment is the same as the first embodiment. In the third embodiment, to emit light in a direction perpendicular to the first surface SF1 of the first insulating film IF1. This allows the semiconductor device to be designed with greater flexibility.

It should be noted that the present invention is not limited to the above-mentioned embodiments, and various modifications can be made without departing from the gist thereof.

In addition, even when a specific numerical value example is described, it may be a numerical value exceeding the specific numerical value, or may be a numerical value less than the specific numerical value, except when it is theoretically obviously limited to the numerical value. In addition, the component means "B containing A as a main component" or the like, and the mode containing other components is not excluded.

Furthermore, the embodiments and the modifications may be arbitrarily combined with each other. That is, the transmission of light between the second optical waveguide OW2 and the third optical waveguide OW3 and the optical waveguide OW1 may be performed by evanescent coupling or may be performed by reflection.

Furthermore, for example, the first optical waveguide including the end portion (the first end portion EP1) and the other end portion (the second end portion EP2) may include a third end portion.

What is claimed is:

1. A semiconductor device comprising:
   a first insulating film having a first surface and a second surface opposite to the first surface;
   a first optical waveguide formed on the first surface of the first insulating film; and
   a second optical waveguide formed on the second surface of the first insulating film,
   wherein the second optical waveguide, in plan view, overlaps with an end portion of the first optical waveguide without overlapping with another end portion of the first optical waveguide,
   wherein a thickness of the first optical waveguide is greater than a thickness of the second optical waveguide, and
   wherein a width of the first optical waveguide is greater than a width of second optical waveguide.

2. The semiconductor device according to claim 1, wherein a thickness of the first insulating film is equal to or less than a thickness of the second optical waveguide.

3. The semiconductor device according to claim 1, wherein a thickness of the first insulating film is equal to or less than the thickness of the second optical waveguide.

4. The semiconductor device according to claim 1,
wherein the end portion of the first optical waveguide overlaps with an end portion of the second optical waveguide in plan view, and
wherein the other end portion of the first optical waveguide is located on an outer edge of the first insulating film.

5. The semiconductor device according to claim 1,
wherein the end portion of the first optical waveguide has a first width and a first thickness, and
wherein the other end portion of the first optical waveguide has a second width greater than the first width and a second thickness greater than the first thickness.

6. The semiconductor device according to claim 1,
wherein a first angle formed by a first edge of the second optical waveguide and the second surface of the first insulating film is smaller than a second angle formed by a side surface of the second optical waveguide and the second surface of the first insulating film, and
wherein a second edge of the first optical waveguide is inclined along the first edge of the second optical waveguide.

7. The semiconductor device according to claim 6,
wherein the first edge of the first optical waveguide, in plan view, overlaps with the second optical waveguide, and
wherein the second edge of the second optical waveguide, in a plan view, overlaps with the first optical waveguide.

8. The semiconductor device according to claim 7, wherein the first angle is 35° or more and 55° or less.

9. The semiconductor device according to claim 7,
wherein a crystal plane of the first edge of the first optical waveguide is a (111) plane, and
wherein a crystal plane of the second edge of the second optical waveguide is a (111) plane.

10. The semiconductor device according to claim 7,
wherein a third edge of the first optical waveguide is located on an opposite side of the first edge in the first optical waveguide, and
wherein the third edge of the first optical waveguide, in plan view, is located on an outer edge of the first insulating film.

11. The semiconductor device according to claim 1, comprising a third optical waveguide formed on the second surface of the first insulating film,
wherein the third optical waveguide, in plan view, overlaps with the other end portion of the first optical waveguide.

12. The semiconductor device according to claim 1, comprising a second insulating film formed on the first surface of the first insulating film such that the second insulating film covers the first optical waveguide.

13. A method of manufacturing a semiconductor device, comprising:
(a) providing a semiconductor wafer comprising:
a first semiconductor layer;
a first insulating film formed on the first semiconductor layer; and
a second semiconductor layer formed on the first insulating film;
(b) patterning the first semiconductor layer to form a first optical waveguide; and
(c) patterning the second semiconductor layer to form a second optical waveguide,
wherein the second optical waveguide, in plan view, overlaps with an end portion of the first optical waveguide without overlapping with another end portion of the first optical waveguide,
wherein a thickness of the first optical waveguide is greater than a thickness of the second optical waveguide, and
wherein a width of the first optical waveguide is greater than a width of second optical waveguide.

14. The method of manufacturing a semiconductor device according to claim 13, comprising:
(d) forming a multilayer wiring layer on the first insulating film so as to cover the second optical waveguide; and
(e) disposing a support member on the multilayer wiring layer,
wherein the (b) is performed after the (e).

15. The method of manufacturing a semiconductor device according to claim 14, wherein the first angle is 35° or more and 55° or less.

16. The method of manufacturing a semiconductor device according to claim 14, wherein a thickness of the first insulating film is smaller than the thickness of the second optical waveguide.

17. The method of manufacturing a semiconductor device according to claim 15, comprising:
(f) processing a first edge of the first optical waveguide by wet etching method; and
(g) In the step of processing a second edge of the second optical waveguide by wet etching.

18. The method of manufacturing a semiconductor device according to claim 17,
wherein a crystal plane of the first edge of the first optical waveguide is a (111) plane, and
wherein a crystal plane of the second edge of the second optical waveguide is a (111) plane.

19. The method of manufacturing a semiconductor device according to claim 15, wherein the (c) is performed before the (b).

* * * * *